US012658688B2

(12) United States Patent
Huang et al.

(10) Patent No.: US 12,658,688 B2
(45) Date of Patent: Jun. 16, 2026

(54) POWER SUPPLY CIRCUIT, WORKING METHOD OF POWER SUPPLY CIRCUIT, AND LIGHTING DEVICE

(71) Applicant: Aputure Imaging Industries Co., Ltd., Shenzhen (CN)

(72) Inventors: Yi Huang, Shenzhen (CN); Xiangjun Zhou, Shenzhen (CN); Yi Xie, Shenzhen (CN); Kun Tong, Shenzhen (CN)

(73) Assignee: Aputure Imaging Industries Co., Ltd., Shenzhen (CN)

( * ) Notice: Subject to any disclaimer, the term of this patent is extended or adjusted under 35 U.S.C. 154(b) by 146 days.

(21) Appl. No.: 18/401,002

(22) Filed: Dec. 29, 2023

(65) Prior Publication Data

US 2024/0136807 A1 Apr. 25, 2024
US 2024/0235179 A9 Jul. 11, 2024

Related U.S. Application Data

(63) Continuation of application No. PCT/CN2021/132145, filed on Nov. 22, 2021.

(30) Foreign Application Priority Data

Oct. 27, 2021 (CN) .......................... 202111253159.0

(51) Int. Cl.
*H02H 7/00* (2006.01)
*H05B 47/24* (2020.01)

(52) U.S. Cl.
CPC ............. *H02H 7/008* (2013.01); *H05B 47/24* (2020.01)

(58) Field of Classification Search
CPC ................................ H02H 7/008; H05B 47/24

USPC .......................................................... 361/90
See application file for complete search history.

(56) References Cited

U.S. PATENT DOCUMENTS

| | | | |
|---|---|---|---|
| 6,301,133 B1 | 10/2001 | Cuadra et al. | |
| 10,931,099 B1 | 2/2021 | Flor et al. | |
| 11,742,653 B2 * | 8/2023 | Nandy | H02H 5/04 |
| | | | 361/93.8 |
| 2014/0168052 A1 | 6/2014 | Zhang | |
| 2014/0218828 A1 * | 8/2014 | Lin | H02H 7/09 |
| | | | 361/33 |

(Continued)

FOREIGN PATENT DOCUMENTS

| | | |
|---|---|---|
| CN | 103457346 A | 12/2013 |
| CN | 106558868 A | 4/2017 |

(Continued)

OTHER PUBLICATIONS

Chinese Office Action issued in corresponding Chinese Patent Application No. 202111253159.0 dated Dec. 7, 2021, pp. 1-10.

(Continued)

*Primary Examiner* — Michael R. Fin
(74) *Attorney, Agent, or Firm* — PV IP PC; Wei Te Chung

(57) ABSTRACT

A power source circuit includes a first power source subcircuit. The first power source subcircuit includes a first overvoltage protection circuit, a first undervoltage protection circuit, a first drive circuit, and a first switching circuit. A cascade output result of the first over-voltage protection circuit and the first undervoltage protection circuit is used to control the first switching circuit for on-off control of the first power source subcircuit.

16 Claims, 11 Drawing Sheets

(56) References Cited

U.S. PATENT DOCUMENTS

| 2019/0260199 A1 | 8/2019 | Turcan |
|---|---|---|
| 2020/0083740 A1 | 3/2020 | Sultenfuss et al. |

FOREIGN PATENT DOCUMENTS

| CN | 208971123 U | 6/2019 |
|---|---|---|
| CN | 111771325 A | 10/2020 |
| CN | 112542829 A | 3/2021 |
| CN | 112737084 A | 4/2021 |
| CN | 113485181 A | 10/2021 |
| JP | 2013025696 A | 2/2013 |

OTHER PUBLICATIONS

International Search Report in International application No. PCT/CN2021/132145, mailed on Jul. 12, 2022.
Written Opinion of the International Search Authority in International application No. PCT/CN2021/132145, mailed on Jul. 12, 2022.

\* cited by examiner

110

120

150

210

310

320

POWER SUPPLY CIRCUIT, WORKING METHOD OF POWER SUPPLY CIRCUIT, AND LIGHTING DEVICE

CROSS-REFERENCE TO RELATED APPLICATIONS

This application is a continuation application of International Application No. PCT/CN2021/132145, filed on Nov. 22, 2021, which claims priority to Chinese Application No. 202111253159.0, filed on Oct. 27, 2021. The disclosures of the above applications are incorporated herein by reference in their entireties.

FIELD

The present disclosure relates to power supply technologies, and in particular, to a power supply circuit, a working method of a power supply circuit, and a lighting device.

BACKGROUND

A power supply circuit usually has neither an under-voltage protection function nor an over-voltage protection function. Even if a power supply circuit has an under-voltage protection function and/or an over-voltage protection function, the under-voltage protection function and the over-voltage protection function are generally independent of each other so that it will take a long time to perform both under-voltage protection detection and over-voltage protection detection that are required, which may seriously affect timeliness of power supply circuit protection.

It should be noted that the above introduction to the background art is merely intended to facilitate understanding of the present disclosure and does not mean that the above is considered to be known in the art.

SUMMARY

In a first aspect, a power supply circuit according to one or more embodiments of the present disclosure includes one or more power supply subcircuits, a first power supply subcircuit of the power supply subcircuits including: a first over-voltage protection circuit, the first over-voltage protection circuit having an input terminal connected to an input terminal of the first power supply subcircuit, and being configured to receive an input voltage to the first power supply subcircuit and output a first control signal; a first under-voltage protection circuit, the first under-voltage protection circuit having a first input terminal connected to the input terminal of the first power supply subcircuit and a second input terminal connected to an output terminal of the first over-voltage protection circuit, and being configured to receive at least one of the first control signal or the input voltage and output a second control signal based on the at least one of the first control signal or the input voltage; a first drive circuit, the first drive circuit having an input terminal connected to an output terminal of the first under-voltage protection circuit to receive the second control signal; and a first switching circuit, the first switching circuit having a control terminal connected to an output terminal of the first drive circuit, and is configured for on-off control of the first power supply subcircuit, the first drive circuit being configured to perform one of: in response to determining that the input voltage is greater than a preset lower limit voltage and less than a preset upper limit voltage, controlling the first switching circuit to be turned on; and in response to determining that the input voltage is greater than or equal to the preset upper limit voltage and/or is less than or equal to the preset lower limit voltage, controlling the first switching circuit to be turned off.

In a second aspect, a working method of a power supply circuit according to one or more embodiments of the present disclosure includes: providing one or more power supply subcircuits in the power supply circuit, a first power supply subcircuit of the power supply subcircuits including a first over-voltage protection circuit, a first under-voltage protection circuit, a first drive circuit, and a first switching circuit; electrically connecting an input terminal of the first power supply subcircuit to an input terminal of the first over-voltage protection circuit and a first input terminal of the first under-voltage protection circuit; electrically connecting an output terminal of the first over-voltage protection circuit to a second input terminal of the first under-voltage protection circuit; electrically connecting an output terminal of the first under-voltage protection circuit to an input terminal of the first drive circuit; and electrically connecting an output terminal of the first drive circuit to a control terminal of the first switching circuit for on-off control of the first power supply subcircuit, the first drive circuit being configured to perform one of: in response to determining that the input voltage is greater than a preset lower limit voltage and less than a preset upper limit voltage, controlling the first switching circuit to be turned on; and in response to determining that the input voltage is greater than or equal to the preset upper limit voltage and/or is less than or equal to the preset lower limit voltage, controlling the first switching circuit to be turned off.

In a third aspect, a lighting device according to one or more embodiments of the present disclosure includes a power supply circuit and a light-emitting device in any of above-described embodiments, the light-emitting device being electrically connected to the power supply circuit.

DETAILED DESCRIPTION

Some embodiments of the present disclosure will be described in detail below with reference to the accompanying drawings. The embodiments are described for illustrative purposes only and are not intended to limit the present disclosure.

Figure 1:
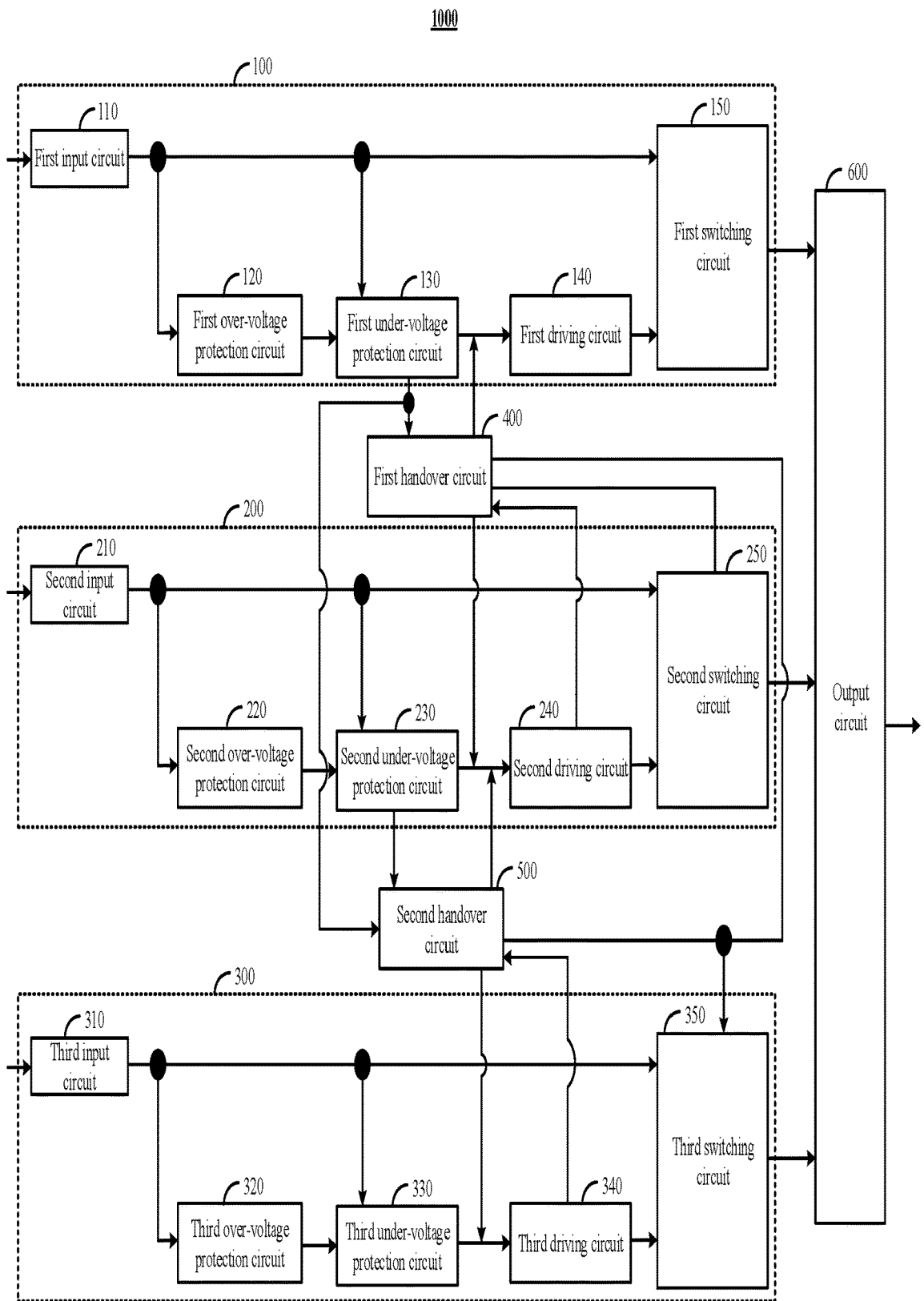
FIG. 1 is a schematic structural diagram of a power supply circuit according to one or more embodiments of the present disclosure.

As shown in FIG. 1, a power supply circuit 1000 according to one or more embodiments includes at least one power supply subcircuit. A first power supply subcircuit 100 includes a first over-voltage protection circuit 120, a first under-voltage protection circuit 130, a first drive circuit 140, and a first switching circuit 150. The first over-voltage protection circuit 120 has an input terminal connected to an input terminal of the first power supply subcircuit 100 and is configured to output a first control signal. The first under-voltage protection circuit 130 has a first input terminal connected to an input terminal of the first power supply subcircuit 100 and a second input terminal connected to an output terminal of the first over-voltage protection circuit 120, and is configured to output a second control signal according to the first control signal and/or a supply voltage of the first power supply subcircuit 100. The first drive circuit 140 has an input terminal connected to an output terminal of the first under-voltage protection circuit 130 and is configured to receive a second control signal. The first switching circuit 150 has a control terminal connected to an output terminal of the first drive circuit 140 and is configured for an on-off control of the first power supply subcircuit 100. In response to determining that the supply voltage of the first power supply subcircuit 100 is greater than a preset lower limit voltage and less than a preset upper limit voltage, the first drive circuit 140 controls the first switching circuit 150 to be turned on. In response to determining that the supply voltage of the first power supply subcircuit 100 is greater than or equal to the preset upper limit voltage, and/or the supply voltage of the first power supply subcircuit 100 is less than or equal to the preset lower limit voltage, the first drive circuit 140 controls the first switching circuit 150 to be turned off.

It will be appreciated that in the power supply circuit 1000 according to the present embodiment, the first over-voltage circuit 120 is set with the preset upper limit voltage (for example, a maximum voltage that the power supply circuit 1000 allows to input), The first under-voltage protection circuit is set with the preset lower limit voltage (for example, a minimum voltage that the power supply circuit 100 allows to input). By comparing the input voltage to the power supply circuit 1000 with the preset upper limit voltage of the first over-voltage protection circuit 120 and the preset lower limit voltage of the first under-voltage circuit 130, respectively, the first switching circuit 150 is controlled by a cascaded output result of the first over-voltage protection circuit 120 and the first under-voltage protection circuit 130, thus an on-off control of the first switching circuit 150 can be performed to so as to realize an on-off control of input and output of the first power supply subcircuit 100. In response to determining that an input voltage to the first power supply subcircuit 100 is greater than the preset upper limit voltage, the first over-voltage protection circuit 120 can detect a signal so that output of the first over-voltage protection circuit 120 is pulled down to ground. Since the first under-voltage protection circuit 130 is connected to an output terminal of the first over-voltage protection circuit 120, a first input terminal of the first under-voltage protection circuit 130 and the input voltage to the first power supply subcircuit 100 are directly pulled down to ground. In this case, the first under-voltage protection circuit 130 can directly output an under-voltage result without performing an under-voltage protection detection. The under-voltage protection detection time can be saved, and the over-voltage protection and the timeliness of the under-voltage protection of the power supply circuit 1000 are improved. It should be understood that the preset upper limit voltage and the preset lower limit voltage herein may be fixed values, respectively, or may float within a certain range of values.

In response to determining that the input voltage to the first power supply subcircuit 100 is greater than or equal to the preset upper limit voltage of the first over-voltage protection circuit 120 (for example, the preset upper limit voltage is 80 v. In this case, the input voltage is 90 v), the first over-voltage protection circuit 120 may output a control signal (for example, a high-level signal) to pull the output of the first over-voltage protection circuit 120 and the input connected to the first under-voltage protection circuit 130 by the first over-voltage protection circuit 120 low (for example, both are pulled to ground). In this case, the voltage input to the first input terminal of the first under-voltage protection circuit 130 by the first power supply subcircuit 100 is also pulled low to ground, so that the first under-voltage protection circuit 130 output a control signal (for example, a low level signal) to the first drive circuit 140. A control signal (for example, a low-level signal) is transmitted by the first drive circuit 140 so that the first switching circuit 150 is disconnected (that is, not closed and not switched on).

In response to determining that the input voltage to the first power supply subcircuit 100 is less than or equal to the preset lower limit voltage of the first under-voltage protection circuit 130 (for example, the preset lower limit voltage is 20 v. In this case, the input voltage is 15 v), the first over-voltage protection circuit 120 may output a control signal (for example, a low-level signal) so that the first over-voltage protection circuit 120 and the first under-voltage protection circuit 130 are disconnected (that is, not switched on). In this case, a voltage divided by the voltage input to the first input terminal of the first under-voltage protection circuit 130 by the first power supply subcircuit 100 is still less than the preset lower limit voltage of the first under-voltage protection circuit 130, so that the first under-voltage protection circuit 130 outputs a control signal (for example, a low-level signal) to the first drive circuit 140. A control signal (for example, a low-level signal) is transmitted by the first drive circuit 140 so that the first switching circuit 150 is disconnected.

In response to determining that a supply voltage (that is, an initial input voltage) of the first power supply subcircuit 100 is less than the preset upper limit voltage of the first over-voltage protection circuit 120 and greater than the preset lower limit voltage of the first under-voltage protection circuit 130 (for example, the preset upper limit voltage is 80 v, the preset lower limit voltage is 20 v, and the input voltage is 48 v), the first over-voltage protection circuit 120 may correspondingly output the first control signal (for example, a low-level signal) so that the first over-voltage protection circuit 120 and the first under-voltage protection circuit 130 are disconnected (that is, not switched on). The first under-voltage protection circuit 130 may output a second high-level control signal according to a first high-level control signal (that is, the first under-voltage protection circuit 130 compares with the resistance voltage division of its own and outputs the second high-potential control signal). In this case, the voltage divided by the voltage input from the first power supply subcircuit 100 to the first input terminal of the first under-voltage protection circuit 130 is greater than the preset lower limit voltage of the first under-voltage protection circuit 130, so that the first under-voltage protection circuit 130 outputs a control signal (for example, a high-level signal) to the first drive circuit 140. A control signal (e.g., a high-level signal) is transmitted by the first drive circuit 140 so that the first switching circuit 150 is switched on. In this case, the first power supply subcircuit 100 can normally supply power to the back-end load.

In some embodiments, the first over-voltage protection circuit 120 and the first under-voltage protection circuit 130 may also be interchanged in positions, or only one of the protection circuits may be used in order to achieve one of over-voltage or under-voltage functions.

In one or more embodiments, the first power supply subcircuit 100 further includes a first input circuit 110. The first input circuit 110 has an input terminal for receiving a voltage input, such as a first DC voltage DC1. An output terminal of the first input circuit 110 is connected to the input terminal of the first over-voltage protection circuit 120, the first input terminal of the first under-voltage protection circuit 130 and the input terminal of the first switching circuit 150, and is for maintaining a potential of the first DC voltage DC1 and filtering the first DC voltage DC1.

Figure 2:
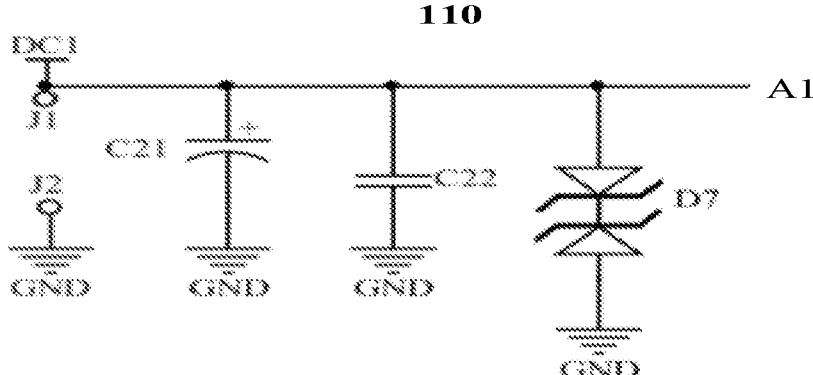
FIG. 2 is a schematic structural diagram of a first input circuit according to one or more embodiments of the present disclosure.

As shown in FIG. 2, in one or more embodiments, the first input circuit 110 may include a thirty-eighth capacitor C21, a thirty-ninth capacitor C22, and a second bidirectional regulator diode D7. A first input terminal J1 is connected to a terminal of the thirty-eighth capacitor C21, a terminal of the thirty-ninth capacitor C22, and a terminal of the second bidirectional regulator diode D7. The thirty-eighth capacitor C21 may be used for low frequency filtering. The thirty-ninth capacitor C22 may be used for high frequency filtering. The second bidirectional regulator diode D7 may be used to clamp the first direct voltage DC1. A second input terminal J2 is connected to another terminal of the thirty-eighth capacitor C21, another terminal of the thirty-ninth capacitor C22, and another terminal of the second bidirectional regulator diode D7, and grounded.

Figure 3:
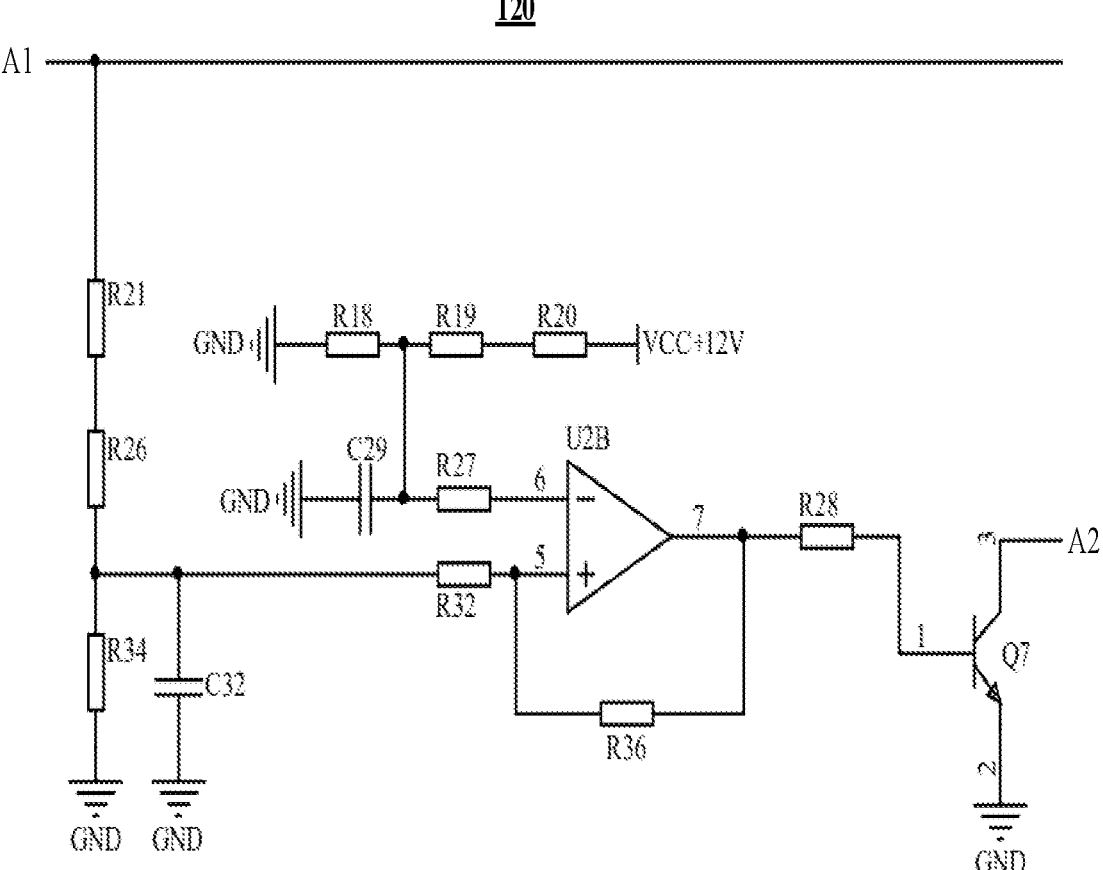
FIG. 3 is a schematic structural diagram of a first over-voltage protection circuit according to one or more embodiments of the present disclosure.

As shown in FIG. 3, in one or more embodiments, the first over-voltage protection circuit 120 may include a first resistor R21, a second resistor R26, a third resistor R34, a fourth resistor R32, a first capacitor C32, a first operational amplifier U2B, a fifth resistor R36, a sixth resistor R27, a second capacitor C29, a seventh resistor R18, an eighth resistor R19, a ninth resistor R20, a tenth resistor R28, and a first transistor Q7. A terminal of the first resistor R21 is connected to the input terminal of the first power supply subcircuit 100. A terminal of the second resistor R26 is connected to another terminal of the first resistor R21. A terminal of the third resistor R34 is connected to another terminal of the second resistor R26. Another terminal of the third resistor R34 is grounded. A terminal of the fourth resistor R32 is connected to a terminal of the third resistor R34. A terminal of the first capacitor C32 is connected to a terminal of the fourth resistor R32. Another terminal of the first capacitor C32 is grounded. A non-inverting input terminal of the first operational amplifier U2B is connected to another terminal of the fourth resistor R32. So that a real-time voltage of the first direct current voltage DC1 is obtained. A terminal of the fifth resistor R36 is connected to the non-inverting input terminal of the first operational amplifier U2B. Another terminal of the fifth resistor R36 is connected to the output terminal of the first operational amplifier U2B. It should be noted that the configuration may constitute a non-inverting feedback of the first operational amplifier U2B, so that the first over-voltage protection circuit 120 has a hysteresis function, thereby preventing a misoperation of the first over-voltage protection circuit 120 near an over-voltage threshold value. A terminal of the sixth resistor R27 is connected to an inverting input terminal of the first operational amplifier U2B. A terminal of the second capacitor C29 is connected to another terminal of the sixth resistor R27. Another terminal of the second capacitor C29 is grounded. A terminal of the seventh resistor R18 is connected to a terminal of the second capacitor C29. Another terminal of the seventh resistor R18 is grounded. A terminal of the eighth resistor R19 is connected to a terminal of the seventh resistor R18. A terminal of the ninth resistor R20 is connected to another terminal of the eighth resistor R19. Another terminal of the ninth resistor R20 is connected to the direct current power source VCC. So that the preset upper limit voltage may be set. A terminal of the tenth resistor R28 is connected to an output terminal of the first operational amplifier U2B. A base of the first transistor Q7 is connected to another terminal of the tenth resistor R28. An emitter of the first transistor Q7 is grounded. It will be appreciated that in response to determining that the supply voltage of the first power supply subcircuit 100 is greater than or equal to the preset upper limit voltage, a collector of the first transistor Q7 may output a first control signal. On the contrary, the collector of the first transistor Q7 may output a first high-level control signal.

In one or more embodiments, the transistor in the present disclosure may also be an N-channel field effect transistor having corresponding parameters.

It should be noted that in one or more embodiments, the first over-voltage protection circuit 120 may include one of the first resistor R21 or the second resistor R26, and may also constitute a voltage division detection circuit.

In one or more embodiments, the first over-voltage protection circuit 120 may also include one of an eighth resistor R19 or a ninth resistor R20, and may also implement a divided power supply of a direct current power source VCC.

Figure 4:
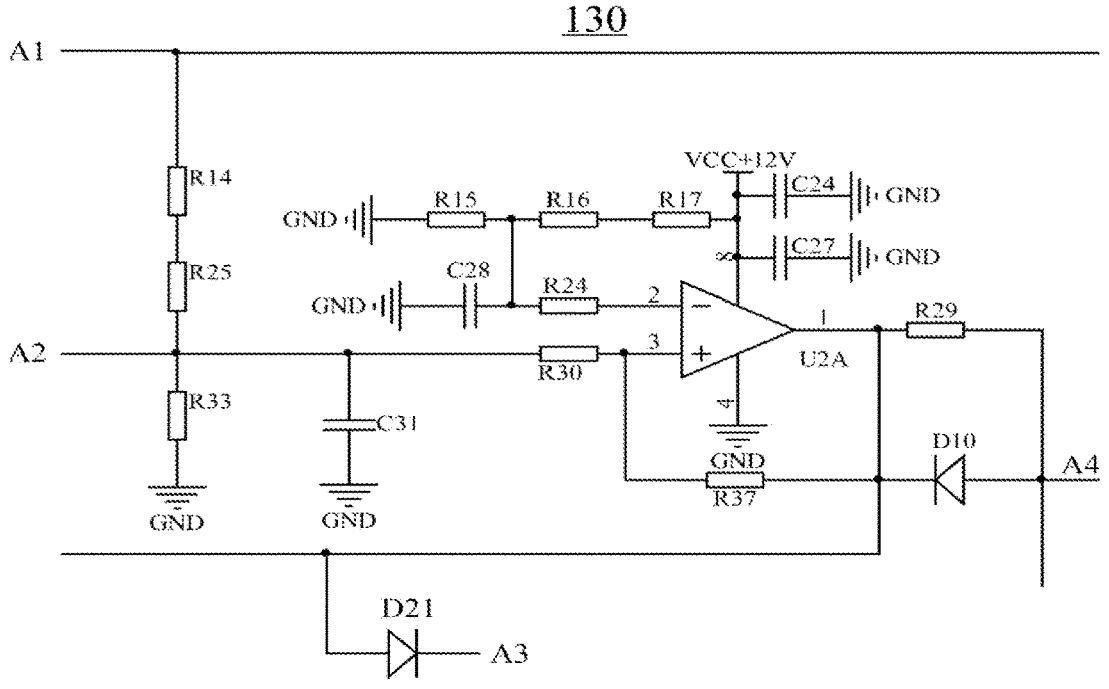
FIG. 4 is a schematic structural diagram of a first under-voltage protection circuit according to one or more embodiments of the present disclosure.

As shown in FIG. 4, in one or more embodiments, the first under-voltage protection circuit 130 may include an eleventh resistor R14, a twelfth resistor R25, a thirteenth resistor R33, a fourteenth resistor R30, a third capacitor C31, a second operational amplifier U2A, a fifteenth resistor R37, a sixteenth resistor R24, a fourth capacitor C28, a seventeenth resistor R15, an eighteenth resistor R16, a nineteenth resistor R17, a fifth capacitor C24, a sixth capacitor C27, a twentieth resistor R29, and a first diode D10. A terminal of the eleventh resistor R14 is connected to a terminal of the first resistor R21. A terminal of the twelfth resistor R25 is connected to another terminal of the eleventh resistor R14. Another terminal of the twelfth resistor R25 is connected to a collector of the first transistor Q7. A terminal of the thirteenth resistor R33 is connected to another terminal of the twelfth resistor R25. Another terminal of the thirteenth resistor R33 is grounded. A terminal of the fourteenth resistor R30 is connected to a terminal of the thirteenth resistor R33. A terminal of the third capacitor C31 is connected to a terminal of the fourteenth resistor R30. Another terminal of the third capacitor C31 is grounded. A non-inverting input terminal of the second operational amplifier U2A is connected to another terminal of the fourteenth resistor R30. So that an output result of the first over-voltage protection circuit 120 and/or the real-time voltage of the first direct current voltage DC1 is received in real time. A negative power supply terminal of the second operational amplifier U2A is grounded. A positive power supply terminal of the second operational amplifier U2A is connected to the direct current power source VCC. A terminal of the fifteenth resistor R37 is connected to a non-inverting input terminal of the second operational amplifier U2A. Another terminal of the fifteenth resistor R37 is connected to the non-inverting input terminal of the second operational amplifier U2A. So that a positive-phase feedback of the second operational amplifier U2A is formed. The first under-voltage protection circuit 130 has a hysteretic function, thereby preventing misoperation of the first under-voltage protection circuit 130 near an under-voltage threshold value. A terminal of the sixteenth resistor R24 is connected to an inverting input terminal of the second operational amplifier U2A. A terminal of the fourth capacitor C28 is connected to another terminal of the sixteenth resistor R24. Another terminal of the fourth capacitor C28 is grounded. A terminal of the seventeenth resistor R15 is connected to a terminal of the fourth capacitor C28. Another terminal of the seventeenth resistor R15 is grounded. A terminal of the eighteenth resistor R16 is connected to a terminal of the seventeenth resistor R15. A terminal of the nineteenth resistor R17 is connected to another terminal of the eighteenth resistor R16. Another terminal of the nineteenth resistor R17 is connected to the direct current power source VCC. It is understood that the configuration may be used for setting the preset lower limit voltage of the first power supply subcircuit 100. A terminal of the fifth capacitor C24 is connected to another terminal of the nineteenth resistor R17. Another terminal of the fifth capacitor C24 is grounded. A terminal of the sixth capacitor C27 is connected to another terminal of the nineteenth resistor R17. Another terminal of the sixth capacitor C27 is grounded. A terminal of the twentieth resistor R29 is connected to an output terminal of the second operational amplifier U2A. A cathode of the first diode D10 is connected to a terminal of the twentieth resistor R29. An anode of the first diode D10 is connected to another terminal of the twentieth resistor R29. The first diode D10 is configured to form a fast discharge path.

In one or more embodiments, the first under-voltage protection circuit 130 may include one of the eleventh resistor R14 or the twelfth resistor R25. The first under-voltage protection circuit 130 may include one of the seventeenth resistor R15 or the eighteenth resistor R16. The first under-voltage protection circuit 130 may not include the fifth capacitor C24 and/or the sixth capacitor C27. The fifth capacitor C24 may be one of a low-frequency filter capacitor or a high-frequency filter capacitor. The sixth capacitor C27 may be another of the low-frequency filter capacitor or the high-frequency filter capacitor.

In one or more embodiments, the first under-voltage protection circuit 130 may also include a fourteenth diode D21. The fourteenth diode D21 is configured to define a directional flow of electrical signals.

Figure 5:
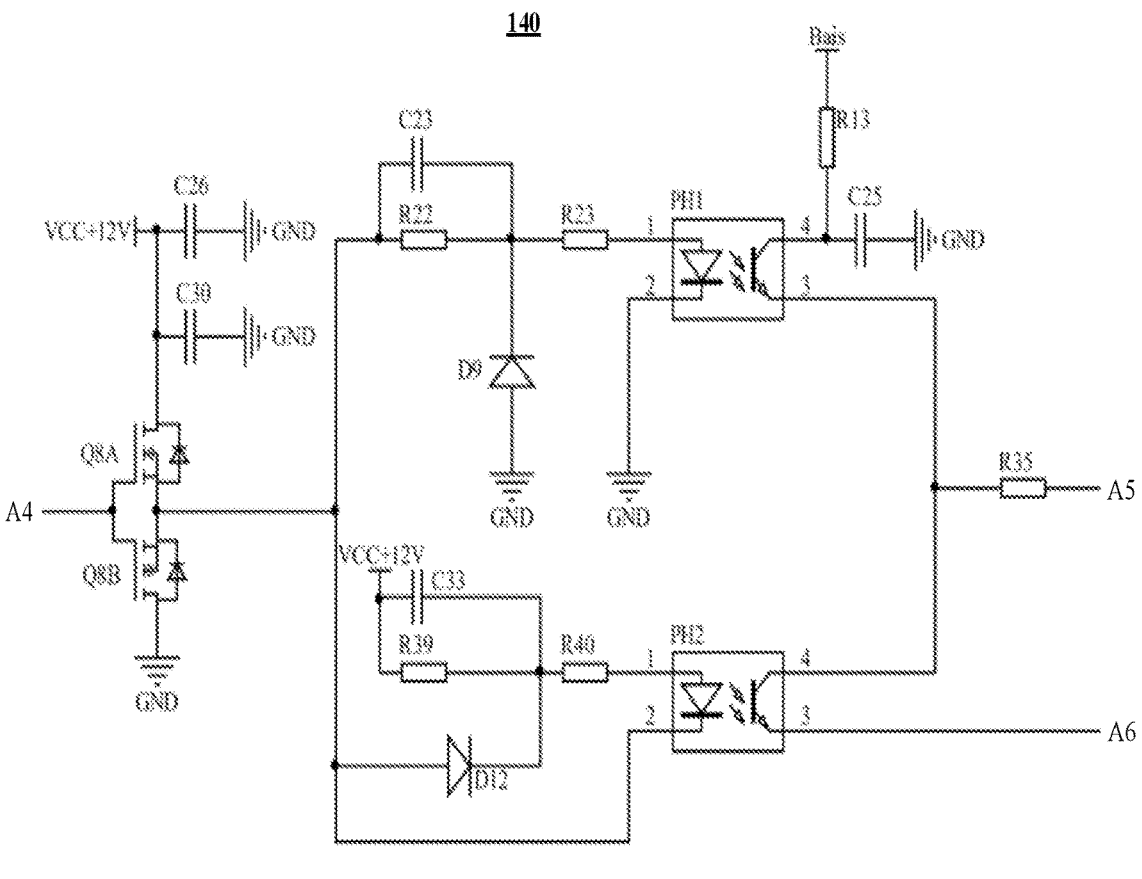
FIG. 5 is a schematic structural diagram of a first drive circuit according to one or more embodiments of the present disclosure.

As shown in FIG. 5, in one or more embodiments, the first drive circuit 140 may include a first field effect transistor Q8A, a second field effect transistor Q8B, a seventh capacitor C26, an eighth capacitor C30, a ninth capacitor C23, a twenty-first resistor R22, a second diode D9, a twenty-second resistor R23, a first optocoupler PH1, a twenty-third resistor R13, a tenth capacitor C25, a third diode D12, a twenty-fourth resistor R39, an eleventh capacitor C33, a twenty-fifth resistor R40, a second optocoupler PH2, and a twenty-sixth resistor R35. A gate of the first field effect transistor Q8A is connected to another terminal of the twentieth resistor R29. A drain of the first field effect transistor Q8A is connected to the direct current power source VCC. A drain of the second field effect transistor Q8B is connected to a source of the first field effect transistor Q8A. A gate of the second field effect transistor Q8B is connected to a gate of the first field effect transistor Q8A. The first field effect transistor Q8A and the second field effect transistor Q8B may constitute a push-pull output circuit to improve a current driving capability. A terminal of the seventh capacitor C26 is connected to the drain of the first field effect transistor Q8A. Another terminal of the seventh capacitor C26 is grounded. A terminal of the eighth capacitor C30 is connected to the drain of the first field effect transistor Q8A. Another terminal of the eighth capacitor C30 is grounded. A terminal of the ninth capacitor C23 is connected to the drain of the second field effect transistor Q8B. A terminal of the twenty-first resistor R22 is connected to a terminal of the ninth capacitor C23. Another terminal of the twenty-first resistor R22 is connected to another terminal of the ninth capacitor C23. A cathode of the second diode D9 is connected to another terminal of the twenty-first resistor R22. An anode of the second diode D9 is grounded. A terminal of the twenty-second resistor R23 is connected to the cathode of the second diode D9. A first pin of the first optocoupler PH1 is connected to another terminal of the twenty-second resistor R23. A second pin of the first optocoupler PH1 is grounded. A terminal of the twenty-third resistor R13 is connected to a fourth pin of the first optocoupler PH1. Another terminal of the twenty-third resistor R13 is connected to a direct current bias power supply Bais. A terminal of the tenth capacitor C25 is connected to a terminal of the twenty-third resistor R13. Another terminal of the tenth capacitor C25 is grounded. The first optocoupler PH1 may be configured for voltage isolation before and after coupling. An anode of the third diode D12 is connected to a terminal of the twenty-first resistor R22. A terminal of the twenty-fourth resistor R39 is connected to a cathode of the third diode D12. Another terminal of the twenty-fourth resistor R39 is connected to the direct current power source VCC. A terminal of the eleventh capacitor C33 is connected to a terminal of the twenty-fourth resistor R39. Another terminal of the eleventh capacitor C33 is connected to the direct current power source VCC. A terminal of the twenty-fifth resistor R40 is connected to a terminal of the eleventh capacitor C33. A first pin of the second optocoupler PH2 is connected to another terminal of the twenty-fifth resistor R40. A second pin of the second optocoupler PH2 is connected to an anode of the third diode D12. A terminal of the twenty-sixth resistor R35 is connected to a third pin of the first optocoupler PH1 and a fourth pin of the second optocoupler PH2. The second optocoupler PH2 is also configured for voltage isolation before and after coupling.

It will be appreciated that in one or more embodiments, the first drive circuit 140 may not include the first field effect transistor Q8A, the second field effect transistor Q8B, the seventh capacitor C26, the eighth capacitor C30, the ninth capacitor C23, the twenty-first resistor R22, the second diode D9, and the twenty-second resistor R23. Accordingly, the first under-voltage protection circuit 130 may be directly electrically connected to the first pin of the first optocoupler PH1 and the second pin of the second optocoupler PH2.

Figure 6:
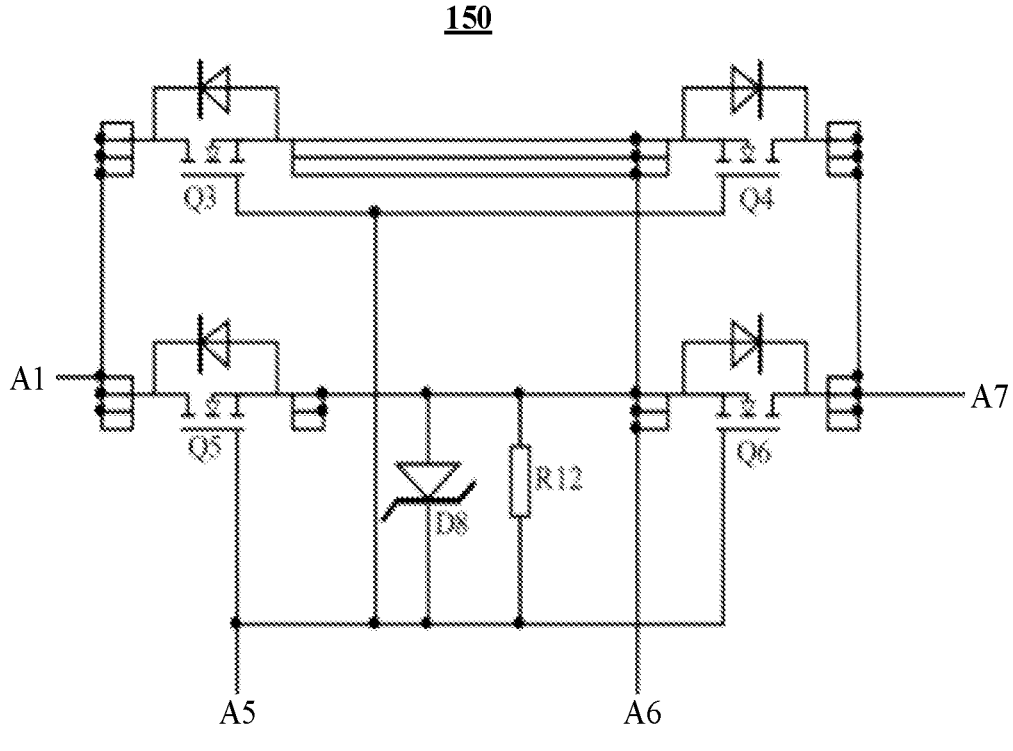
FIG. 6 is a schematic structural diagram of a first switching circuit according to one or more embodiments of the present disclosure.

As shown in FIG. 6, in one or more embodiments, the first switching circuit 150 includes a second field effect transistor Q5 and a third field effect transistor Q6. A drain of the second field effect transistor Q5 is connected to a terminal of the eleventh resistor R14. A gate of the second field effect transistor Q5 is connected to another terminal of the twenty-sixth resistor R35. A gate of the third field effect transistor Q6 is connected to the gate of the second field effect transistor Q5. A source of the third field effect transistor Q6 is connected to a source of the second field effect transistor Q5.

In one or more embodiments, the first switching circuit 150 may include the first field effect transistor Q3, the second field effect transistor Q5, the third field effect transistor Q6, the fourth field effect transistor Q4, the twenty-seventh resistor R12, and the first regulator diode D8. The drain of the first field effect transistor Q3 is connected to a terminal of the eleventh resistor R14. The drain of the second field effect transistor Q5 is connected to the drain of the first field effect transistor Q3. The gate of the second field effect transistor Q5 is connected to another terminal of the twenty-sixth resistor R35. The gate of the third field effect transistor Q6 is connected to the gate of the second field effect transistor Q5. The source of the third field effect transistor Q6 is connected to the source of the first field effect transistor Q3 and the source of the second field effect transistor Q5. The gate of the fourth field effect transistor Q4 is connected to the gate of the third field effect transistor Q6. The source of the fourth field effect transistor Q4 is connected to the source of the third field effect transistor Q6. The drain of the fourth field effect transistor Q4 is connected to the drain of the third field effect transistor Q6. A terminal of the twenty-seventh resistor R12 is connected to the gate of the fourth field effect transistor Q4. Another terminal of the twenty-seventh resistor R12 is connected to the source of the fourth field effect transistor Q4. A cathode of the first regulator diode D8 is connected to the gate of the fourth field effect transistor Q4. An anode of the first regulator diode D8 is connected to the source of the fourth field effect transistor Q4.

At least one of the first field effect transistor Q3, the second field effect transistor Q5, the third field effect transistor Q6, or the fourth field effect transistor Q4 may be an N-channel field effect transistor. In response to determining that a gate potential of the N-channel field effect transistor is greater than a source potential of the N-channel field effect transistor by a certain value, the N-channel field effect transistor is switched on. Otherwise, it is switched off.

It will be appreciated that the first switching circuit 150 according to one or more embodiments can reduce heat generation of the corresponding field effect transistor during operation, and can improve stability and reliability of the entire power supply circuit 1000.

In one or more embodiments, the power supply circuit 1000 may include N+1 power supply subcircuits and N changeover circuits. N is a positive integer. The N changeover circuits are correspondingly electrically connected to the N+1 power supply subcircuits. The N changeover circuits are configured to determine a priority order of the N+1 power supply subcircuits, and changeover a power supply subcircuit with a highest switching priority and a supply voltage between the preset upper limit voltage and the preset lower limit voltage to be turned on.

It will be appreciated that the power supply subcircuit may include multiple power supply subcircuits, for example, the first power supply subcircuit 100, a second power supply subcircuit 200, a third power supply subcircuit 300 and so on. The changeover circuit may include multiple changeover circuits. But the number of the changeover circuits is 1 less than the number of the power supply subcircuits. For example, the switching circuit may include a first switching circuit 400, a second switching circuit 500, and so on. It will be appreciated that from up to bottom, in each power supply subcircuit, an output terminal of each high-priority under-voltage protection circuit is connected to a subsequent corresponding changeover circuit. For example, the first under-voltage protection circuit 120 needs to be electrically connected to the first changeover circuit 400 and the second changeover circuit 500 (which needs to be connected to a corresponding changeover circuit if there are more subsequent power supply subcircuits), and the second under-voltage circuit 230 is electrically connected to the second changeover circuit 500 (which needs to be connected to a corresponding changeover circuit if there is more subsequent power supply subcircuits). The changeover circuit is between two adjacent power supply subcircuits, and each changeover circuit is further electrically connected between the under-voltage protection circuit and the drive circuit of two adjacent power supply subcircuits, respectively. For example, the first switching circuit 400 is electrically connected between the first under-voltage protection circuit 130 and the first drive circuit 140, and the first switching circuit 400 is electrically connected between the second under-voltage protection circuit 230 and the second drive circuit 240. A high-priority changeover circuit is further electrically connected to a switching circuit of each subsequent stage. The changeover circuit is also electrically connected to a corresponding drive circuit. For example, the first changeover circuit 400 is electrically connected to the first drive circuit 140 and the second drive circuit 240. It should be understood that in response to determining that the input voltage to the first power supply subcircuit 100 meets the preset upper limit voltage and preset lower limit voltage, the first switching circuit 150 is switched on, and the first under-voltage protection circuit 130 sends a control signal to the first changeover circuit 400. So that the first changeover circuit 400 remains switched off without controlling the second switching circuit 250 to be switched on or off And the first under-voltage protection circuit 130 also sends a control signal to the second switching circuit 500, so that the second switching circuit 500 does not control the third switching circuit 350 to be switched on. Only in response to determining that an input voltage to a power supply subcircuit meets a requirement, a corresponding switching circuit can be switched on to allow the operation thereof. So that in response to determining that a high-priority power supply subcircuit meets the requirement, a control right of a low-priority power supply subcircuit can be released. That is, in response to determining that the high-priority power supply subcircuit meets the requirement, the high-priority power supply subcircuit does not affect an operation of the low-priority circuit if the low-priority power supply subcircuit meets the requirement. If the input voltage to the first power supply subcircuit 100 does not meet the preset upper limit voltage or the preset lower limit voltage, and the second power supply subcircuit meets the requirement, power is supplied by the second power supply subcircuit. If the first power supply subcircuit meets the requirements again, the first switching circuit 400 controls the second switching circuit 250 to be switched off. That is, the low-priority power supply subcircuit that originally meets requirements of the preset upper limit voltage and the preset lower limit voltage is switched off, and the high priority power supply subcircuit that meets the requirements of the preset upper limit voltage and the preset lower limit voltage again is switched on.

For example, the N+1 power supply subcircuits may include the second power supply subcircuit 200. The N changeover circuits may include the first switching circuit 400. The second power supply subcircuit 200 may adopt a same circuit topology as the first power supply subcircuit 100.

The second power supply subcircuit 200 may include the second input circuit 210, the second over-voltage protection circuit 220, the second under-voltage protection circuit 230, the second drive circuit 240, and the second switching circuit 250.

Figure 7:
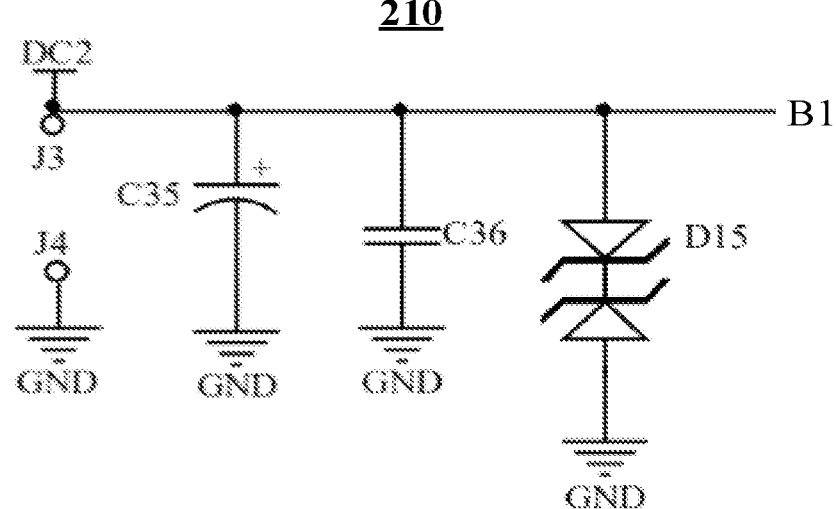
FIG. 7 is a schematic structural diagram of a second input circuit according to one or more embodiments of the present disclosure.

As shown in FIG. 7, in one or more embodiments, the second input circuit 210 may include a fortieth capacitor C35, a forty-first capacitor C36, and a third bidirectional regulator diode D15. The second input circuit 210 may have a same circuit topology as the first input circuit 110.

Figure 8:
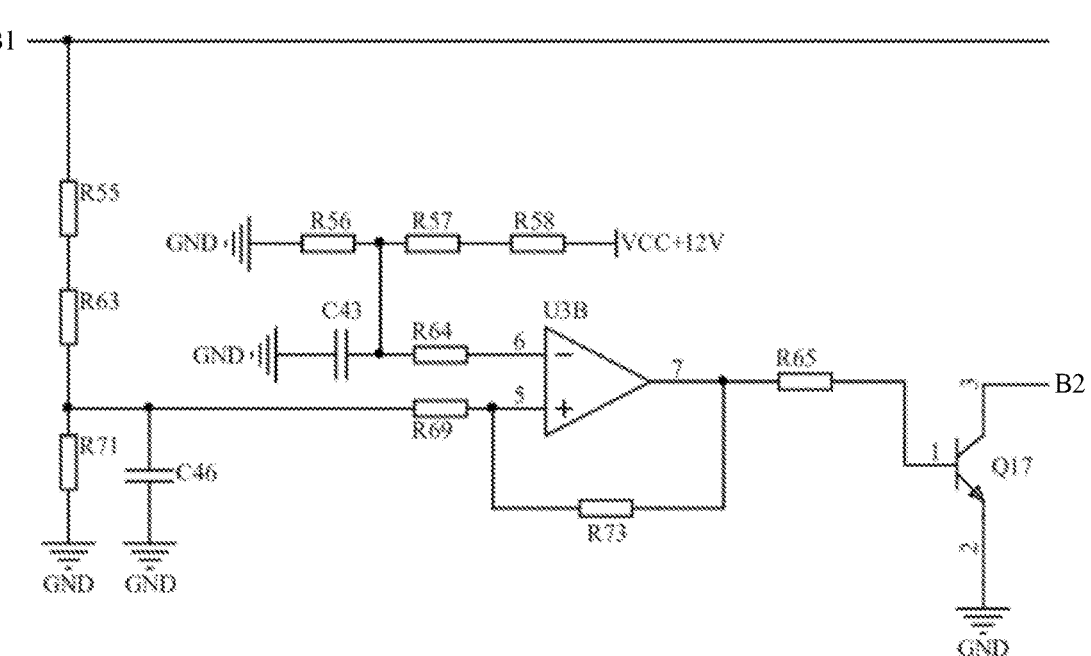
FIG. 8 is a schematic structural diagram of a second over-voltage protection circuit according to one or more embodiments of the present disclosure.

As shown in FIG. 8, in one or more embodiments, the second over-voltage protection circuit 220 may include a twenty-eighth resistor R55, a twenty-ninth resistor R63, a thirtieth resistor R71, a thirty-first resistor R69, a twelfth capacitor C46, a third operational amplifier U3B, a thirty-second resistor R73, a thirty-third resistor R64, a thirteenth capacitor C43, a thirty-fourth resistor R56, a thirty-fifth resistor R57, a thirty-sixth resistor R58, a thirty-seventh resistor R65, and a second transistor Q17. The second over-voltage protection circuit 220 may have a same circuit topology as the first over-voltage protection circuit 120.

Figure 9:
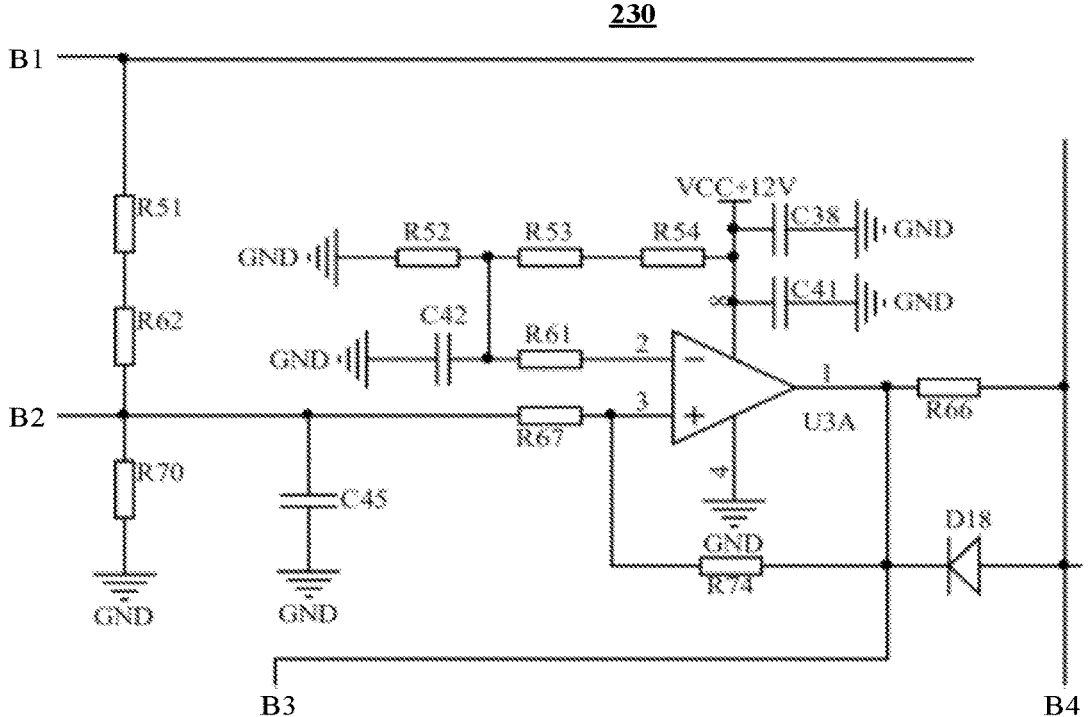
FIG. 9 is a schematic structural diagram of a second under-voltage protection circuit according to one or more embodiments of the present disclosure.

As shown in FIG. 9, in one or more embodiments, the second under-voltage protection circuit 230 may include a thirty-eighth resistor R51, a thirty-ninth resistor R62, a fortieth resistor R70, a forty-first resistor R67, a fourteenth capacitor C45, a fourth operational amplifier U3A, a forty-second resistor R74, a forty-third resistor R61, a fifteenth capacitor C42, a forty-fourth resistor R52, a forty-fifth resistor R53, a forty-sixth resistor R54, a sixteenth capacitor C38, a seventeenth capacitor C41, a forty-seventh resistor R66, and a fourth diode D18. The second under-voltage protection circuit 230 may have the same circuit topology as the first under-voltage protection circuit 130.

Figure 10:
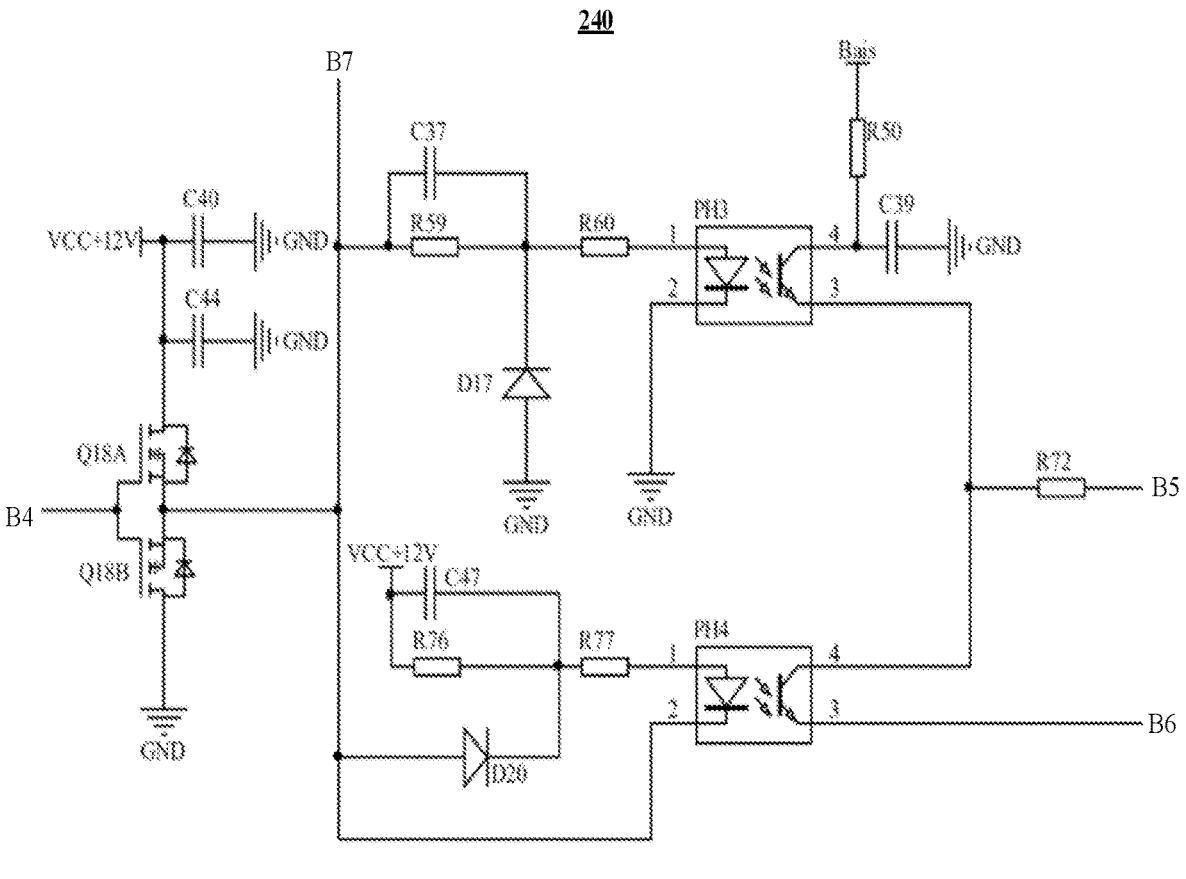
FIG. 10 is a schematic structural diagram of a second drive circuit according to one or more embodiments of the present disclosure.

As shown in FIG. 10, in one or more embodiments, the second drive circuit 240 may include a third field effect transistor Q18A, a fourth field effect transistor Q18B, an eighteenth capacitor C40, a nineteenth capacitor C44, a twentieth capacitor C37, a forty-eighth resistor R59, a fifth diode D17, a forty-ninth resistor R60, a third optocoupler PH3, a fiftieth resistor R50, a twenty-first capacitor C39, a sixth diode D20, a fifty-first resistor R76, a twenty-second capacitor C47, a fifty-second resistor R77, a fourth optocoupler PH4, and a fifty-third resistor R72. The second drive circuit 240 may have a same circuit topology as the first drive circuit 140.

Figure 11:
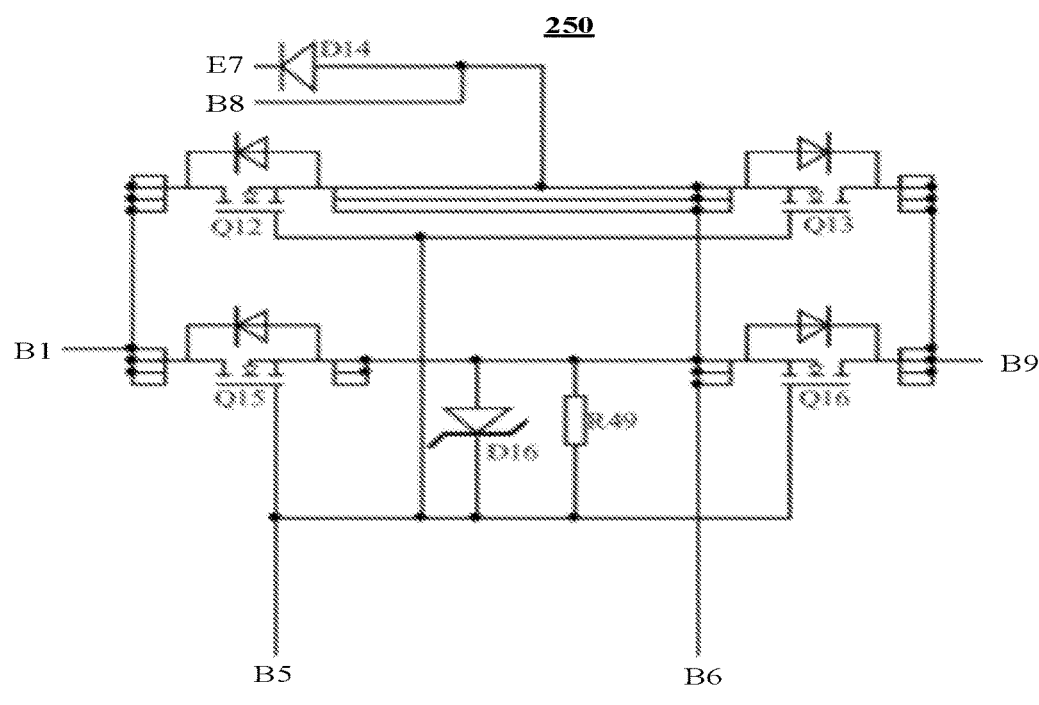
FIG. 11 is a schematic structural diagram of a second switching circuit according to one or more embodiments of the present disclosure.

As shown in FIG. 11, in one or more embodiments, the second switching circuit 250 may include a fifth field effect transistor Q12, a sixth field effect transistor Q15, a seventh field effect transistor Q16, an eighth field effect transistor Q13, a fifty-fourth resistor R49, and a second regulator diode D16. The second switching circuit 250 may have a same circuit topology as the first switching circuit 150.

For example, the N+1 power supply subcircuits may further include the third power supply subcircuit 300, and the N changeover circuits may further include the second changeover circuit 500. The third power supply subcircuit 300 may adopt a same circuit topology as the first power supply subcircuit 100.

The third power supply subcircuit 300 may include a third input circuit 310, a third over-voltage protection circuit 320, a third under-voltage protection circuit 330, a third drive circuit 340, and a third switching circuit 350.

Figure 12:
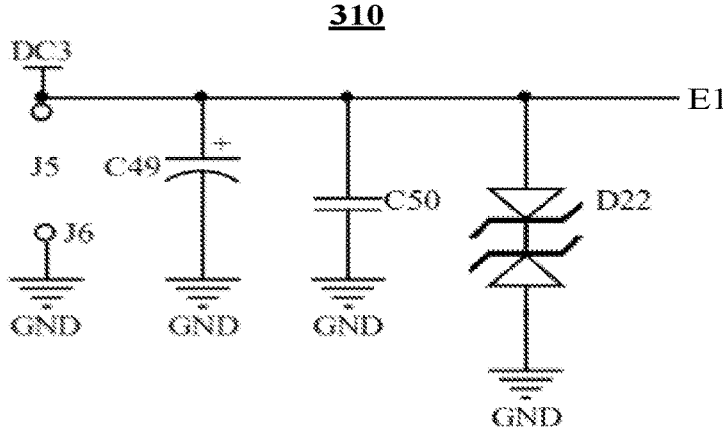
FIG. 12 is a schematic structural diagram of a third input circuit according to one or more embodiments of the present disclosure.

As shown in FIG. 12, in one or more embodiments, the third input circuit 310 may include a forty-second capacitor C49, a forty-third capacitor C50, and a fourth bidirectional regulator diode D22. The third input circuit 310 may also have a same circuit topology as the first input circuit 110.

Figure 13:
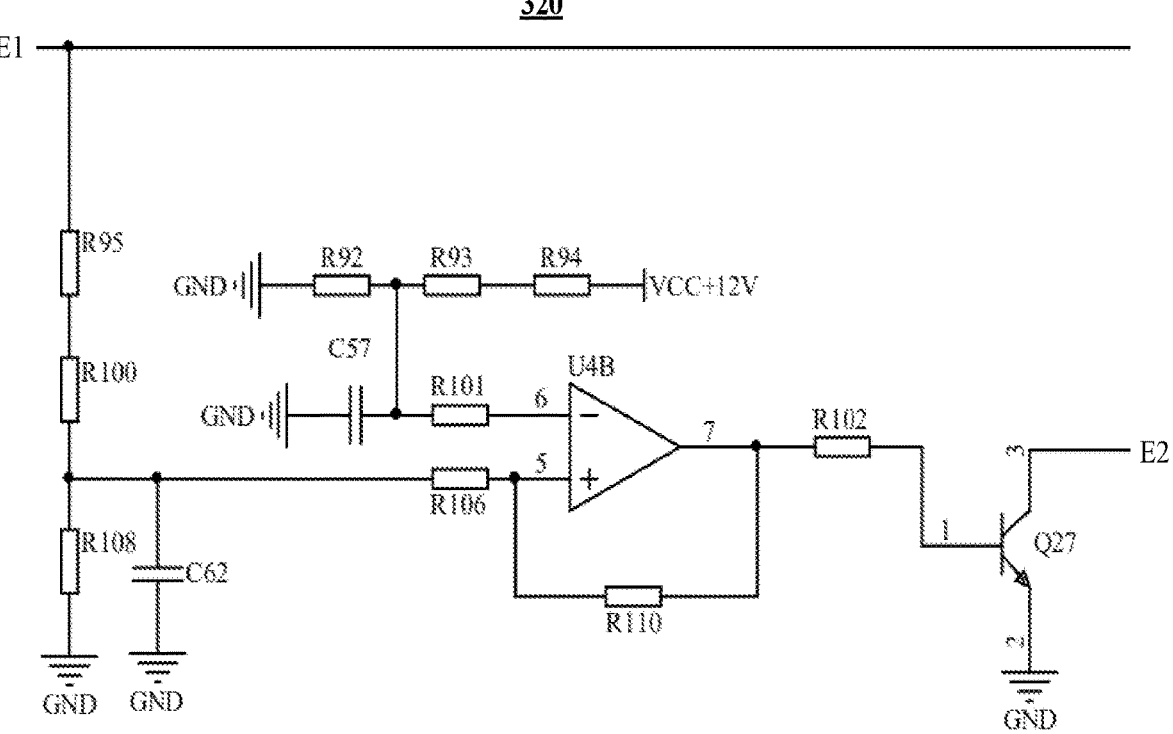
FIG. 13 is a schematic structural diagram of a third over-voltage protection circuit according to one or more embodiments of the present disclosure.

As shown in FIG. 13, in one or more embodiments, the third over-voltage protection circuit 320 includes a fifty-fifth resistor R95, a fifty-sixth resistor R100, a fifty-seventh resistor R108, a fifty-eighth resistor R106, a twenty-third capacitor C62, a fifth operational amplifier U4B, a fifty-ninth resistor R110, a sixtieth resistor R101, a twenty-fourth capacitor C57, a sixty-first resistor R92, a sixty-second resistor R93, a sixty-third resistor R94, a sixty-fourth resistor R102, and a third triode Q27. The third over-voltage protection circuit 320 may also have a same circuit topology as the first over-voltage protection circuit 120.

Figure 14:
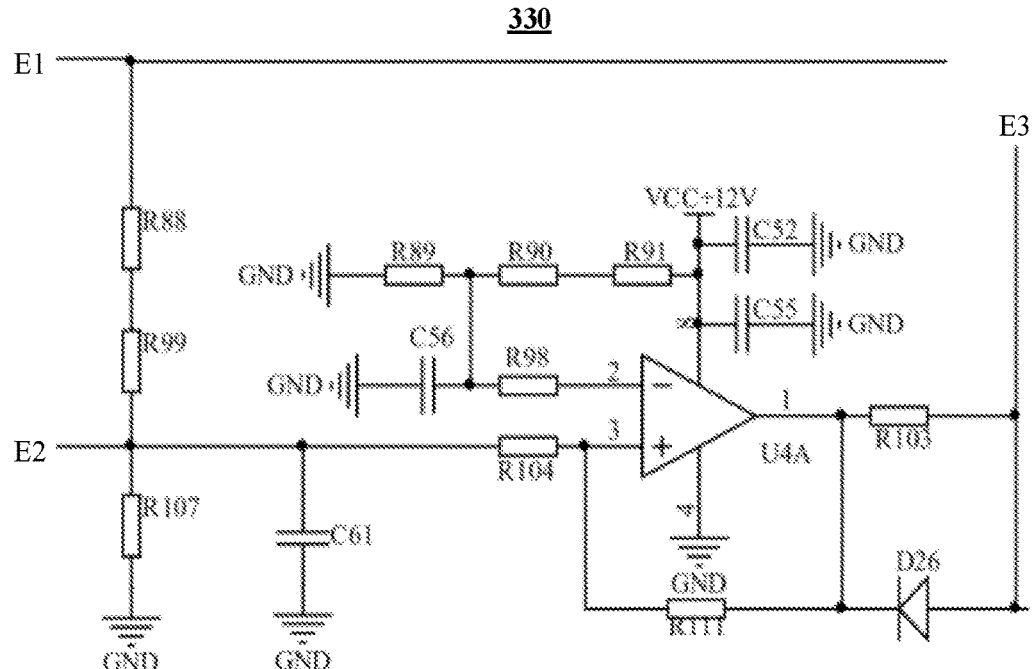
FIG. 14 is a schematic structural diagram of a third under-voltage protection circuit according to one or more embodiments of the present disclosure.

As shown in FIG. 14, in one or more embodiments, the third under-voltage protection circuit 330 includes a sixty-fifth resistor R88, a sixty-sixth resistor R99, a sixty-seventh resistor R107, a sixty-eighth resistor R104, a twenty-fifth capacitor C61, a sixth operational amplifier U4A, a sixty-ninth resistor R111, a seventieth resistor R98, a twenty-sixth capacitor C56, a seventy-first resistor R89, a seventy-second resistor R90, a seventy-third resistor R91, a twenty-seventh capacitor C52, a twenty-eighth capacitor C55, a seventy-fourth resistor R103, and a seventh diode D26. The third under-voltage protection circuit 330 may also have a same circuit topology as the first under-voltage protection circuit 130.

Figure 15:
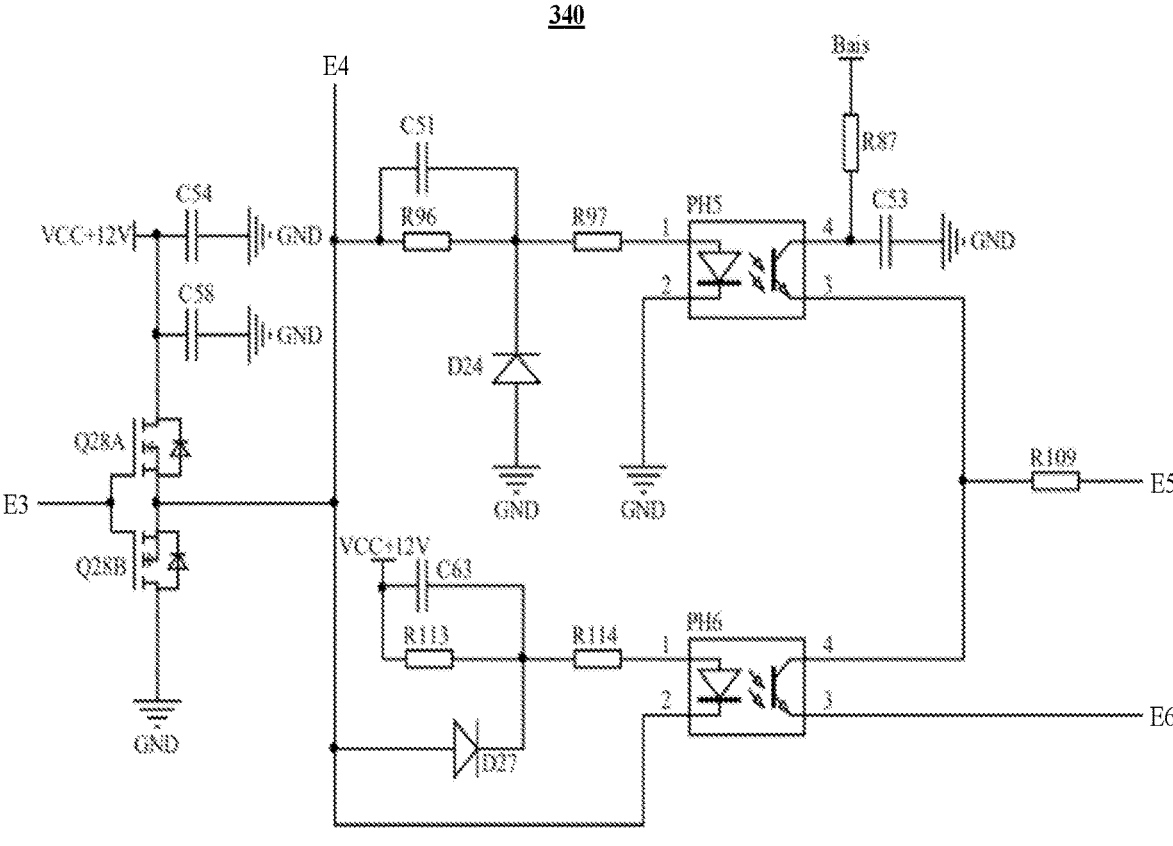
FIG. 15 is a schematic structural diagram of a third drive circuit according to one or more embodiments of the present disclosure.

As shown in FIG. 15, in one or more embodiments, the third drive circuit 340 includes a fifth field effect transistor Q28A, a sixth field effect transistor Q28B, a twenty-ninth capacitor C54, a thirtieth capacitor C58, a thirty-first capacitor C51, a seventy-fifth resistor R96, an eighth diode D24, a seventy-sixth resistor R97, a fifth optocoupler PH5, a seventy-seventh resistor R87, a thirty-second capacitor C53, a ninth diode D27, a seventy-eighth resistor R113, a thirty-third capacitor C63, a seventy-ninth resistor R114, a sixth optocoupler PH6, and an eightieth resistor R109. The third drive circuit 340 may also have a same circuit topology as the first drive circuit 140.

Figure 16:
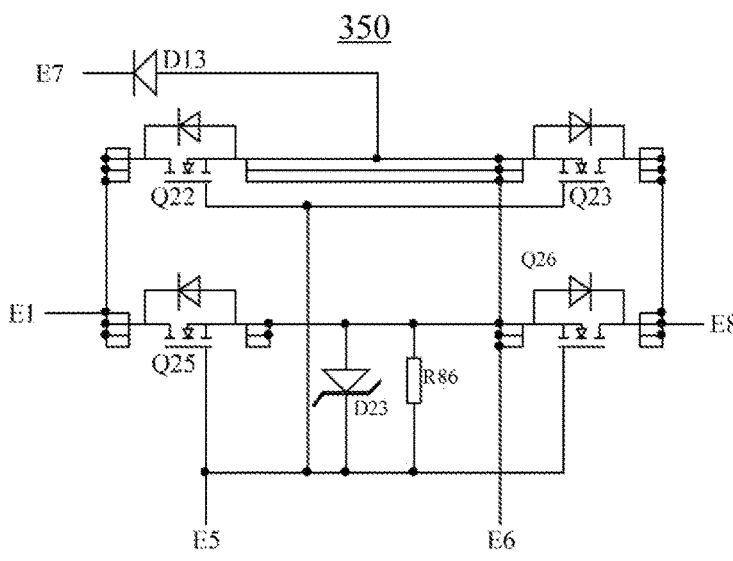
FIG. 16 is a schematic structural diagram of a third switching circuit according to one or more embodiments of the present disclosure.

As shown in FIG. 16, in one or more embodiments, the third switching circuit 350 includes a ninth field effect transistor Q22, a tenth field effect transistor Q25, an eleventh field effect transistor Q26, a twelfth field effect transistor Q23, an eighty-one resistor R86, and a third regulator diode D23. The third switching circuit 350 may also have a same circuit topology as the first switching circuit 150.

Figure 17:
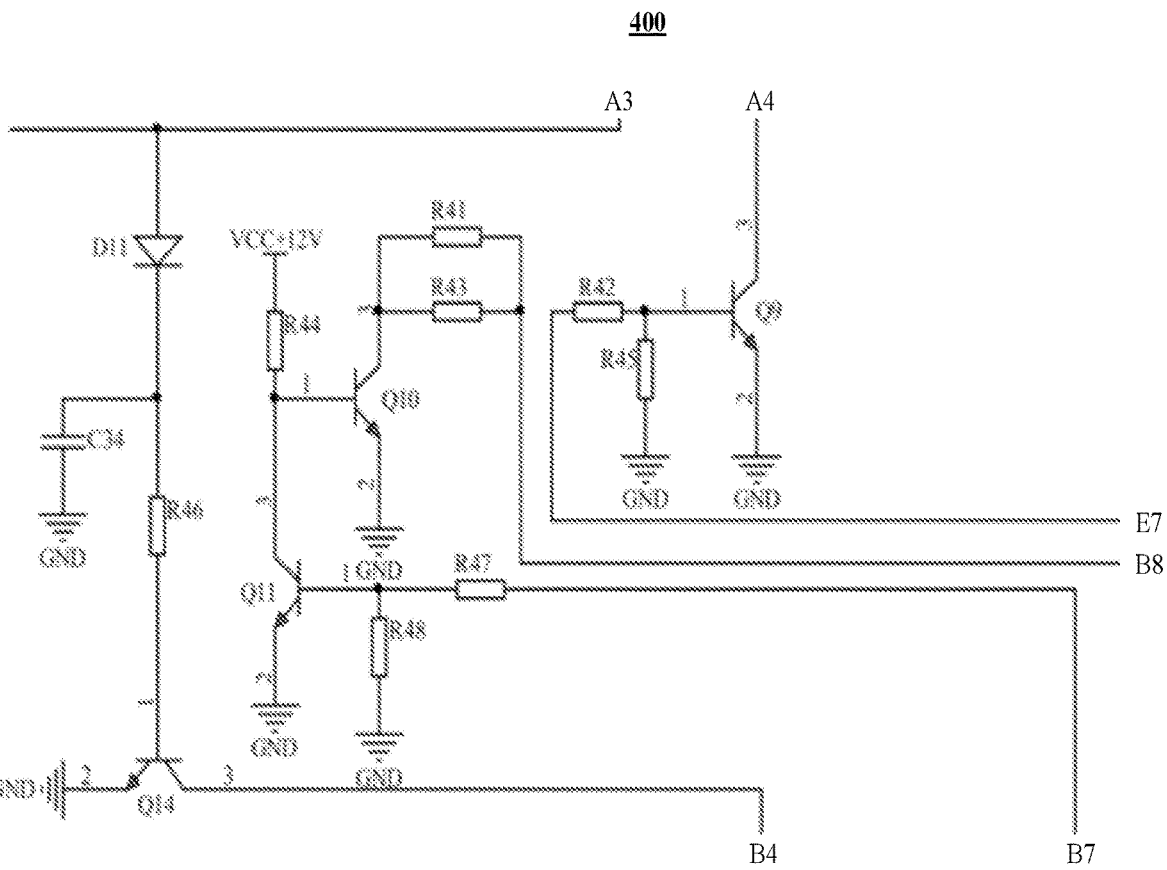
FIG. 17 is a schematic structural diagram of a first changeover circuit according to one or more embodiments of the present disclosure.
Figure 18:
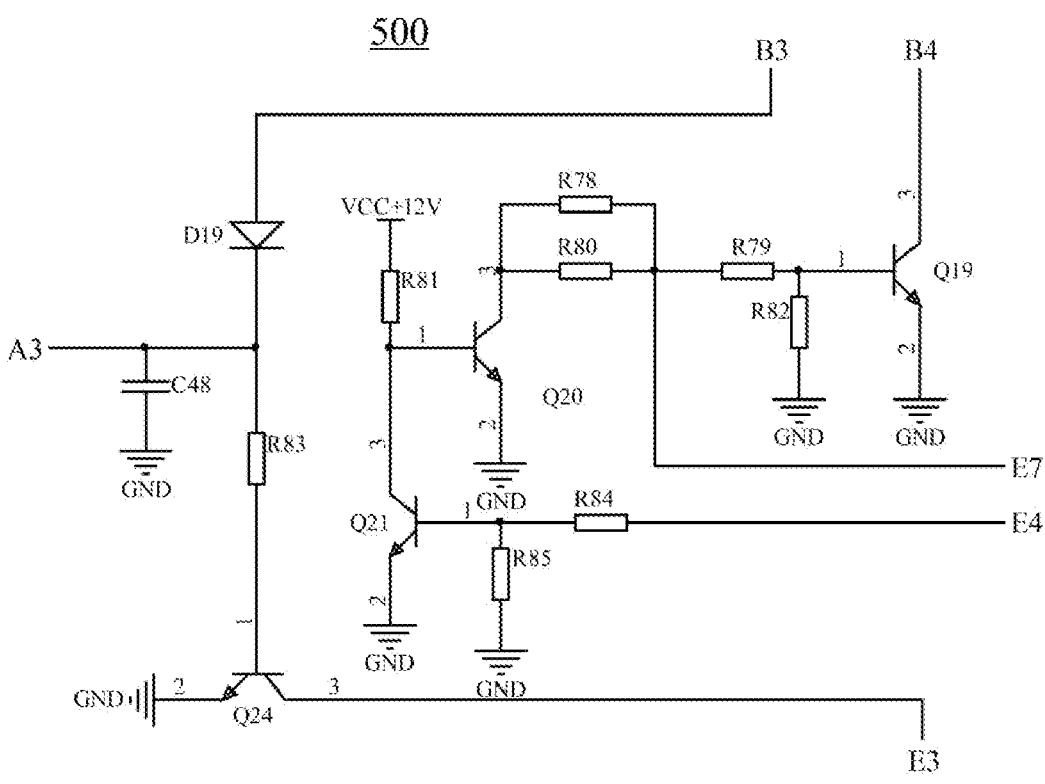
FIG. 18 is a schematic structural diagram of a second changeover circuit according to one or more embodiments of the present disclosure.
Figure 19:
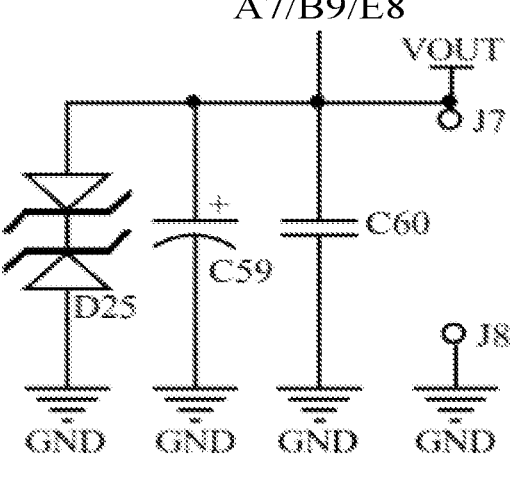
FIG. 19 is a schematic structural diagram of an output circuit according to one or more embodiments of the present disclosure.

As shown in FIG. 17, in one or more embodiments, the first switching circuit 400 may include a tenth diode D11, an eighty-second resistor R46, a thirty-fourth capacitor C34, a fourth transistor Q14, an eighty-third resistor R44, a fifth transistor Q11, an eighty-fourth resistor R47, an eighty-fifth resistor R48, a sixth transistor Q10, an eighty-sixth resistor R41, an eighty-seventh resistor R43, a tenth diode D13, a tenth diode D14, an eighty-eighth resistor R42, an eighty-ninth resistor R45, and a seventh transistor Q9. An anode of the tenth diode D11 is connected to an output terminal of the second operational amplifier U2A. A terminal of the eighty-second resistor R46 is connected to a cathode of the tenth diode D11. A terminal of the thirty-fourth capacitor C34 is connected to a cathode of the tenth diode D11. Another terminal of the thirty-fourth capacitor C34 is grounded. Abase of the fourth transistor Q14 is connected to another terminal of the eighty-second resistor R46. An emitter of the fourth transistor Q14 is grounded. A collector of the fourth transistor Q14 is connected to another terminal of the forty-seventh resistor R66. This configuration may be used for determining that a priority of the first power supply subcircuit 100 is higher than a priority of the second power supply subcircuit 200. A terminal of the eighty-third resistor R44 is connected to the direct current power source VCC. A collector of the fifth transistor Q11 is connected to another terminal of the eighty-third resistor R44. An emitter of the fifth transistor Q11 is grounded. A terminal of the eighty-fourth resistor R47 is connected to a base of the fifth transistor Q11. Another terminal of the eighty-fourth resistor R47 is connected to a terminal of the forty-eighth resistor R59. A terminal of the eighty-fifth resistor R48 is connected to a terminal of the eighty-fourth resistor R47. Another terminal of the eighty-fifth resistor R48 is grounded. A base of the sixth transistor Q10 is connected to another terminal of the eighty-third resistor R44, the emitter of the sixth transistor Q10 is grounded. A terminal of the eighty-sixth resistor R41 is connected to a collector of the sixth transistor Q10. A terminal of the eighty-seventh resistor R43 is connected to the collector of the sixth transistor Q10. Another terminal of the eighty-seventh resistor R43 is connected to another terminal of the eighty-sixth resistor R41 and a source of the fifth field effect transistor Q12. By this configuration, when the second power supply subcircuit 200 performs over-voltage protection and/or under-voltage protection, the second switching circuit 250 can be securely switched off. An anode of the tenth diode D13 is connected to a source of the ninth field effect transistor Q22. An anode of the tenth diode D14 is connected to a source of the fifth field effect transistor Q12. A terminal of the eighty-eighth resistor R42 is connected to a cathode of the tenth diode D13 and a cathode of the tenth diode D14. A terminal of the eighty-ninth resistor R45 is connected to another terminal of the eighty-eighth resistor R42. Another terminal of the eighty-ninth resistor R45 is grounded. A gate of the seventh transistor Q9 is connected to a terminal of the eighty-ninth resistor R45. An emitter of the seventh transistor Q9 is grounded. A collector of the seventh transistor Q9 is connected to another terminal of the twentieth resistor R29. By this configuration, it can ensure that the first power supply subcircuit 100 starts normal power supply only when the second power supply subcircuit 200 and/or the third power supply subcircuit 300 are reliably powered off.

In one or more embodiments, the first switching circuit 400 may also include one of the eighty-sixth resistor R41 or the eighty-seventh resistor R43, and other electrical connection relationships may remain unchanged.

In one or more embodiments, the second switching circuit 500 may include a tenth triode D19, a fourteenth diode D21, a ninetieth resistor R83, a thirty-fifth capacitor C48, an eighth triode Q24, a ninety-first resistor R81, a ninth triode Q21, a ninety-second resistor R84, a ninety-third resistor R85, a thirteenth transistor Q20, a ninety-fourth resistor R78, a ninety-fifth resistor R80, a ninety-sixth resistor R79, a ninety-seventh resistor R82, and a tenth triode Q19. This configuration, can be used to determine power supply priority of the first power supply subcircuit 100, and power supply priority of the second power supply subcircuit 200 is higher than a power supply priority of the third power supply subcircuit 300. An anode of the tenth triode D19 is connected to ab output terminal of the fourth operational amplifier U3A. An anode of the fourteenth diode D21 is connected to an output terminal of the second operational amplifier U2A. A terminal of the ninth resistor R83 is connected to a cathode of the tenth triode D19 and a cathode of the fourteenth diode D21. A terminal of the thirty-fifth capacitor C48 is connected to a terminal of the ninth resistor R83. Another terminal of the thirty-fifth capacitor C48 is grounded. A base of the eighth transistor Q24 is connected to another terminal of the ninety resistor R83. An emitter of the eighth transistor Q24 is grounded. A collector of the eighth transistor Q24 is connected to another terminal of the seventy-fourth resistor R103. A terminal of the ninety-first resistor R81 is connected to the direct current power source VCC. A collector of the ninth transistor Q21 is connected to another terminal of the ninety-first resistor R81. An emitter of the ninth transistor Q21 is grounded. A terminal of the ninety-second resistor R84 is connected to a base of the ninth transistor Q21. Another terminal of the ninety-second resistor R84 is connected to a terminal of the seventy-fifth resistor R96. A terminal of the ninety-third resistor R85 is connected to a terminal of the ninety-second resistor R84. Another terminal of the ninety-third resistor R85 is grounded. A base of the thirteenth transistor Q20 is connected to another terminal of the ninety-first resistor R81. An emitter of the thirteenth transistor Q20 is grounded. A terminal of the ninety-fourth resistor R78 is connected to a collector of the thirteenth transistor Q20. A terminal of the ninety-fifth resistor R80 is connected to a collector of the thirteenth transistor Q20. Another terminal of the ninety-fifth resistor R80 is connected to another terminal of the ninety-fourth resistor R78 and a source of the ninth field effect transistor Q22. A terminal of the ninety-sixth resistor R79 is connected to another terminal of the ninety-fifth resistor R80. A terminal of the ninety-seventh resistor R82 is connected to another terminal of the ninety-sixth resistor R79. Another terminal of the ninety-seventh resistor R82 is grounded. A base of the tenth transistor Q19 is connected to a terminal of the ninety-seventh resistor R82. An emitter of the tenth transistor Q19 is grounded. A collector of the tenth transistor Q19 is connected to another terminal of the forty-seventh resistor R66.

In one or more embodiments, the power supply circuit 1000 further includes an output circuit 600. of The output circuit 600 has an input terminal connected to an output terminal of the first switching circuit 150, an output terminal of the second switching circuit 250, and an output terminal of the third switching circuit 350, and is configured for outputting, voltage regulating and filtering of one of a first direct current voltage, a second direct current voltage, and a third direct current voltage.

In one or more embodiments, the output circuit 600 may include a thirty-sixth capacitor C59, a thirty-seventh capacitor C60, and a first bidirectional regulator diode D25. The thirty-sixth capacitor C59 and the thirty-seventh capacitor C60 may serve as an output filter capacitor. The first bidirectional regulator diode D25 may be used for surge voltage protection and electrostatic protection of an output port. A terminal of the thirty-sixth capacitor C59 is connected to a terminal of the thirty-seventh capacitor C60, a terminal of the first bidirectional regulator diode D25, a drain of the third field effect transistor Q6, a drain of the seventh field effect transistor Q16, a drain of the eleventh field effect transistor Q26, and a first output terminal J7. A second output terminal J8 is connected to another terminal of the thirty-sixth capacitor C59, another terminal of the thirty-seventh capacitor C60, and another terminal of the first bidirectional regulator diode D25 and grounded.

In some embodiments, in response to determining that a voltage inputted by the first input circuit 110 is greater than the preset upper limit voltage, a level of pin 5 of U2B is higher than a level of pin 6. Therefore, pin 7 of U2B outputs a high level, and Q7 is switched on. Pin 3 and pin 2 of Q7 are connected and pulled to a low level. An upper terminal of R33 is pulled to ground. R30 is at a low level. Therefore, a level of pin 3 of U2A is lower than a level of pin 2. Pin 1 of U2A outputs a low level. A right terminal of R29 is pulled down. A gate of Q8 (a push-pull circuit including Q8, capacitor C26, or the like may be omitted) is pulled down. PH1 is switched off. PH2 is switched on (on the contrary, in response to determining that input at the right-end of R29 is high, PH1 is switched on, and PH2 is switched off). Q3-Q6 are switched off. Input of the power supply subcircuit and subsequent output are disconnected. Further, Q14 and Q24 are not switched on. A control right for a low-priority channel is released (that is, in response to determining that inputs of other power supply circuits meet a voltage range, the other power supply circuits can operate normally).

In some embodiments, in response to determining that a voltage input by the first input circuit 110 is less than the preset lower limit voltage, a level of pin 5 of U2B is lower than a level of pin of U2B. So that pin 7 of U2B outputs a low level. Q7 is switched off. Three resistors, R14, R25, and R33 are used for a voltage division. So that a level of pin 3 of U2A is lower than a level of pin 2 of U2A. Pin 1 of U2A outputs a low level. The right terminal of R29 is pulled down. The gate of Q8 (a push-pull circuit including Q8, capacitor C26, or the like may be omitted) is pulled down. PH1 is switched off. PH2 is switched on. Q3-Q6 are switched on. Input of the power supply subcircuit and subsequent output are disconnected.

In some embodiments, in response to determining that a voltage input by the first input circuit 110 is less than the preset lower limit voltage and greater than the preset upper limit voltage, a level of pin 5 of U2B is lower than a level of pin of U2B. So that pin 7 of U2B outputs a low level. Q7 is switched off. Three resistors are used for a voltage division. In this case, a level of pin 3 of U2A is higher than a level of pin 2 of U2A. Pin 1 of U2A outputs a high level. The right terminal of R29 is pulled up. PH1 is switched on. PH2 is switched off. Q3-Q6 are switched off. Input of the power supply subcircuit and subsequent output are connected. Q14 and Q24 are connected and pulled to ground. Subsequent switches are switched on. That is, in response to determining that a level of D18/D26 is pulled down, subsequent corresponding switches are all switched off.

It will be appreciated that each of the above circuits is not allowed to be switched on simultaneously. In a condition that Q12-16 are low, Q9 is switched off, thus releasing control of D10. Thus, in response to determining that a high-priority power supply subcircuit is satisfied first, a low-priority power supply subcircuit does not affect the high-priority power supply subcircuit, and the high priority power supply subcircuit is switched on. In response to determining that the high-priority power supply subcircuit is satisfied after the low-priority power supply subcircuit, the low-priority power supply subcircuit is disconnected by the high-priority power supply subcircuit, and the high-priority power supply subcircuit is switched on after a detection of a successful disconnection of the low-priority power supply subcircuit.

In one or more embodiments, based on an inventive concept of the present disclosure, a power supply priority order between the first power supply subcircuit 100, the second power supply subcircuit 200, and the third power supply subcircuit 300 may be correspondingly adjusted according to a configuration of a corresponding connection relationship between N+1 power supply subcircuits and N changeover circuits. For example, in response to determining that a power supply priority of the first power supply subcircuit 100 is higher than a power supply priority of the second power supply subcircuit 200, and the power supply voltage of the first power supply subcircuit 100 is not an under-voltage and/or over-voltage, the power supply circuit according to the present disclosure preferentially selects the first power supply subcircuit 100 for power supply.

It should be noted that technical solutions shown in the drawings of the present disclosure are not all presented in the specification of the present disclosure by way of text description, but other embodiments of the present disclosure may directly and unambiguously determine different embodiments according to corresponding drawings. At least one different embodiment may be obtained according to content of a same drawing.

It should be noted that the first switching circuit 400 and the second switching circuit 500 may constitute a priority logic changeover circuit for controlling the priorities of the first power supply subcircuit 100, the second power supply subcircuit 200 and the third power supply subcircuit 300 and changeover dead time between the first power supply subcircuit 100, the second power supply subcircuit 200 and the third power supply subcircuit 300. Specifically, a priority logic changeover circuit with over-voltage and under-voltage protection and dead time control includes an over-voltage and under-voltage detection circuit for each power supply subcircuit. In response to determining that the voltage of each power supply subcircuit meets the set input voltage range, each detection signal is transmitted to the priority logic changeover circuit for priority automatic changeover between each power supply subcircuit. The priority logic changeover circuit automatically hands over system power supply to the power supply subcircuit that is currently provided by the direct current power source and has a highest priority. That is, in response to determining that it is detected that the high-priority power supply subcircuit meets the preset voltage range, the priority logic changeover circuit automatically hands over the system power supply to the high-priority power supply subcircuit.

Specifically, in the first power supply subcircuit 100, the first under-voltage protection circuit 130 determines whether the supply voltage of the first power supply subcircuit 100 is between the preset upper limit voltage and the preset lower limit voltage by the first over-voltage protection circuit 120 and the first under-voltage protection circuit 130. In response to determining that the supply voltage of the first power supply subcircuit 100 is between the preset upper limit voltage and the preset lower limit voltage, the first under-voltage protection circuit 130 outputs a second control signal of a high level, and the first drive circuit 140 also outputs a corresponding high-level signal, thereby controlling the first power supply subcircuit 100 to be turned on by the first switching circuit 150. Similarly, the second power supply subcircuit 200 and the third power supply subcircuit 300 operate in a same manner as the first power supply subcircuit 100. In this case, the changeover circuits such as the first changeover circuit 400 and the second changeover circuit 500 may control other power supply subcircuits other than the first power supply subcircuit 100 to be turned off.

Similarly, in response to determining that the power supply voltages of the first power supply subcircuit 100 and the third power supply subcircuit 300 are not between the preset upper limit voltage and the preset lower limit voltage, and the power supply voltage of the second power supply subcircuit 200 is between the preset upper limit voltage and the preset lower limit voltage, the changeover circuit such as the first changeover circuit 400 and the second changeover circuit 500 may control that the second power supply subcircuit 200 is switched on but other power supply subcircuits are switched off, without affecting control rights of other power supply subcircuits (that is, in response to determining that the previously switched-on power supply subcircuit is not supplied with power, and other power supply subcircuits meet the voltage requirement again, the other power supply subcircuits can be switched on. And in response to determining that the high-priority power supply subcircuit changes from not meeting the requirement to meeting the requirement again, the high priority power supply subcircuit is switched on again).

In one or more embodiments, the DC bias power supply Bais may be provided by a bias power supply circuit. The bias power supply circuit may include a charge pump. The charge pump is used for providing a switching-on voltage of a N-channel type field effect transistor. The field effect transistors in the above-described embodiments may select an appropriate withstand voltage value and an appropriate conduction internal resistance according to voltage and current of an actual application scenario.

It should be noted that a changeover circuit constructed by relays requires tens of milliseconds or even hundreds of milliseconds to control changeover time of each power supply subcircuit. However, since neither the first changeover circuit 400 nor the second changeover circuit 500 employs the changeover circuit constructed by relays, the switching time for controlling each power supply subcircuit according to the present disclosure can be reduced to a microsecond level.

It will be appreciated that the present disclosure can implement a multi-channel power supply automatic changeover circuit based on an N-channel field effect transistor. It not only meets requirements of miniaturization, ultra-fast response and high reliability, but also avoids a problem of difficult selection and high cost of a P-channel field effect transistor in high DC voltage and high current application scenarios. In addition, the over-voltage protection function and the under-voltage protection function make a system more reliable. The priority logic changeover circuit can realize a faster changeover speed, so that the output voltage of the power supply circuit 1000 is short in fall time and small in fall amplitude, thereby effectively solving a problem of blinking of an LED (Light-Emitting Diode) lamp.

Figure 20:
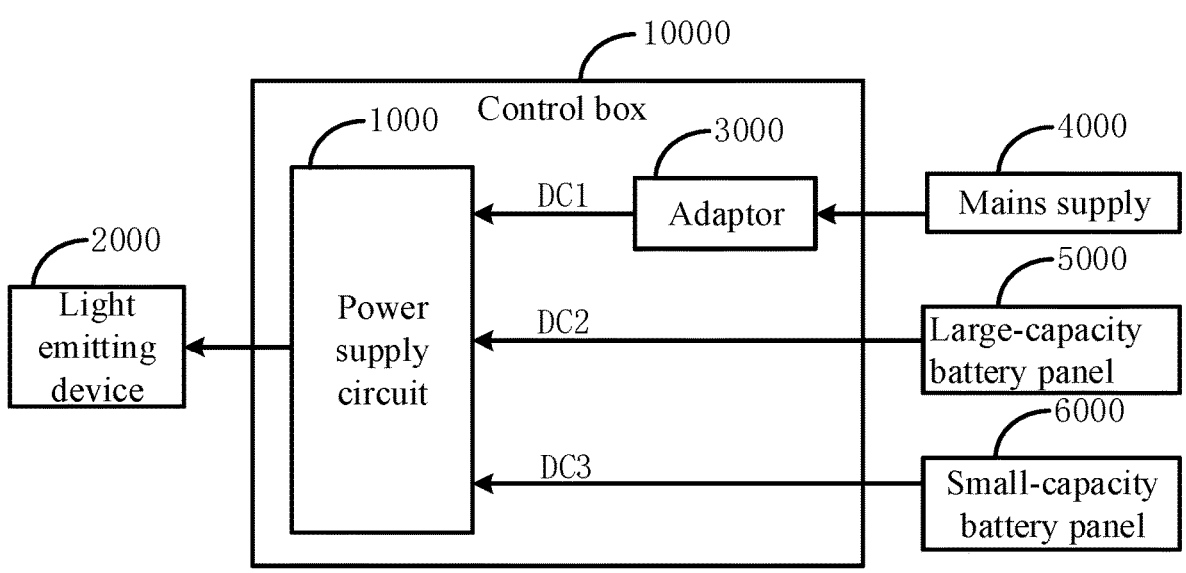
FIG. 20 is a schematic structural diagram of a lighting device according to one or more embodiments of the present disclosure.

As shown in FIG. 20, in one or more embodiments, a lighting device includes a control box 10000 and a light-emitting device 2000. The control box 10000 includes a power supply circuit 1000 in any one above embodiment and an adapter 3000. The light-emitting device 2000 is electrically connected to the power supply circuit 1000. An output terminal of the adapter 3000 is connected to an input terminal of the power supply circuit 1000. A mains supply 4000 is connected to an input terminal of the adapter 3000 and is configured to supply a first DC voltage DC1. A large-capacity battery panel 5000 is connected to another input terminal of the power supply circuit 1000 and is configured to supply a second DC voltage DC2. A small-capacity battery 6000 is connected to another input terminal of the power supply circuit 1000 and is configured to supply a third DC voltage DC3.

It will be appreciated that in a lighting device according to one or more embodiments, the first switching circuit 150 is controlled by a cascaded output result of the first over-voltage protection circuit 120 and the first under-voltage protection circuit 130. Thus, on-off control of the first power supply subcircuit 100 can be performed. That is, in response to determining that an over-voltage occurs in the first power supply subcircuit 100, the first under-voltage protection circuit 130 can directly output the under-voltage protection result without performing under-voltage protection detection, thereby saving the under-voltage protection detection time and improving the timeliness of the over-voltage protection and under-voltage protection of the power supply circuit 1000.

In one or more embodiments, the light-emitting device 2000 may be an LED. Of course, others such as laser diode, or organic light-emitting diode, etc., are possible. The control box 10000 may supply power to the light-emitting device 2000 by a wire or the like.

In one or more embodiments, both the power supply circuit 1000 and the adapter 3000 may be provided inside the control box 10000. Of course, the adapter 3000 may also be provided outside the control box 10000, which is not specifically limited.

In one or more embodiments, the power supply circuit 1000 may be made into an integrated circuit and disposed within a lamp.

In the above-mentioned embodiments, the description of each embodiment has its own emphasis. For parts not described in detail in a certain embodiment, the related description of other embodiments may be referred to.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present disclosure.

What is claimed is:

1. A power supply circuit, comprising one or more power supply subcircuits, wherein a first power supply subcircuit of the power supply subcircuits comprises:

a first over-voltage protection circuit, wherein the first over-voltage protection circuit has an input terminal connected to an input terminal of the first power supply subcircuit, and is configured to receive an input voltage to the first power supply subcircuit and output a first control signal;

a first under-voltage protection circuit, wherein the first under-voltage protection circuit has a first input terminal connected to the input terminal of the first power supply subcircuit and a second input terminal connected to an output terminal of the first over-voltage protection circuit, and is configured to receive at least one of the first control signal or the input voltage and output a second control signal based on the at least one of the first control signal or the input voltage;

a first drive circuit, wherein the first drive circuit has an input terminal connected to an output terminal of the first under-voltage protection circuit to receive the second control signal; and a first switching circuit, wherein the first switching circuit has a control terminal connected to an output terminal of the first drive circuit, and is configured for on-off control of the first power supply subcircuit, wherein the first drive circuit is configured to perform one of: in response to determining that the input voltage is greater than a preset lower limit voltage and less than a preset upper limit voltage, controlling the first switching circuit to be turned on; and in response to determining that the input voltage is greater than or equal to the preset upper limit voltage and/or is less than or equal to the preset lower limit voltage, controlling the first switching circuit to be turned off; and wherein the first over-voltage protection circuit comprises:

a first resistor having a terminal connected to the input terminal of the first power supply subcircuit;

a third resistor having a terminal connected to another terminal of the first resistor, and another terminal grounded;

a fourth resistor having a terminal connected to the terminal of the third resistor;

a first operational amplifier having a non-inverting input terminal connected to another terminal of the fourth resistor;

a fifth resistor having a terminal connected to the non-inverting input terminal of the first operational amplifier, and another terminal connected to an output terminal of the first operational amplifier;

a sixth resistor having a terminal connected to an inverting input terminal of the first operational amplifier;

a second capacitor having a terminal connected to another terminal of the sixth resistor, and another terminal grounded;

a seventh resistor having a terminal connected to the terminal of the second capacitor, and another terminal grounded;

a ninth resistor having a terminal connected to the terminal of the seventh resistor, and another terminal connected to a direct current power source;

a tenth resistor having a terminal connected to the output terminal of the first operational amplifier; and a first transistor having a base connected to another terminal of the tenth resistor, and an emitter grounded.

2. The power supply circuit according to claim 1, wherein the power supply subcircuits comprise N+1 power supply subcircuits, where N is a positive integer, the power supply circuit further comprising:

N changeover circuits electrically connected to the N+1 power supply subcircuits, wherein the N changeover circuits are configured to determine a priority order of the N+1 power supply subcircuits and switch one of the N+1 power supply subcircuits, which has a highest priority in the priority order and a supply voltage to which is greater than the preset lower limit voltage and less than the preset upper limit voltage, to be turned on.

3. The power supply circuit according to claim 2, wherein the first under-voltage protection circuit comprises:

an eleventh resistor having a terminal connected to the terminal of the first resistor;

a thirteenth resistor having a terminal connected to another terminal of the eleventh resistor, and another terminal grounded;

a fourteenth resistor having a terminal connected to the terminal of the thirteenth resistor;

a second operational amplifier having a non-inverting input terminal connected to another terminal of the fourteenth resistor, a negative power supply terminal grounded, and a positive power supply terminal connected to the direct current power source;

a fifteenth resistor having a terminal connected to the non-inverting input terminal of the second operational amplifier, and another terminal connected to an output terminal of the second operational amplifier;

a sixteenth resistor having a terminal connected to an inverting input terminal of the second operational amplifier;

a fourth capacitor having a terminal connected to another terminal of the sixteenth resistor, and another terminal grounded;

a seventeenth resistor having a terminal connected to the terminal of the fourth capacitor, and another terminal grounded;

a nineteenth resistor having a terminal connected to the terminal of the seventeenth resistor, and another terminal connected to the direct current power source;

a twentieth resistor having a terminal connected to the output terminal of the second operational amplifier; and a first diode having a cathode connected to the terminal of the twentieth resistor, and an anode connected to another terminal of the twentieth resistor.

4. The power supply circuit according to claim 3, wherein the first drive circuit comprises:

a first optocoupler having a first pin connected to the another terminal of the twentieth resistor, and a second pin grounded;

a twenty-third resistor having a terminal connected to a fourth pin of the first optocoupler, and another terminal connected to a direct current bias power source;

a tenth capacitor having a terminal connected to the terminal of the twenty-third resistor, and another terminal grounded;

a twenty-fifth resistor having a terminal connected to the direct current power source;

a second optocoupler having a first pin connected to another terminal of the twenty-fifth resistor, and a second pin connected to the another terminal of the twentieth resistor; and a twenty-sixth resistor having a terminal connected to a third pin of the first optocoupler and a fourth pin of the second optocoupler.

5. The power supply circuit according to claim 4, wherein the first drive circuit further comprises:

a first field effect transistor having a gate connected to the another terminal of the twentieth resistor, and a drain connected to the direct current power source;

a second field effect transistor having a drain connected to a source of the first field effect transistor, and a gate connected to the gate of the first field effect transistor;

a ninth capacitor having a terminal connected to the drain of the second field effect transistor;

a twenty-first resistor having a terminal connected to the terminal of the ninth capacitor, and another terminal connected to another terminal of the ninth capacitor;

a second diode having a cathode connected to the another terminal of the twenty-first resistor, and an anode grounded;

a twenty-second resistor having a terminal connected to the cathode of the second diode;

a third diode having an anode connected to the terminal of the twenty-first resistor;

a twenty-fourth resistor having a terminal connected to a cathode of the third diode, and another terminal connected to the direct current power source; and an eleventh capacitor having a terminal connected to the terminal of the twenty-fourth resistor, and another terminal connected to the direct current power source.

6. The power supply circuit according to claim 5, wherein the first switching circuit comprises:

a third field effect transistor having a drain connected to the terminal of the eleventh resistor, and a gate connected to another terminal of the twenty-sixth resistor; and a fourth field effect transistor having a gate connected to the gate of the third field effect transistor, and a source connected to a source of the third field effect transistor.

7. The power supply circuit according to claim 6, wherein a first changeover circuit of the N changeover circuits comprises:

a tenth diode having an anode connected to the output terminal of the second operational amplifier;

an eighty-second resistor having a terminal connected to a cathode of the tenth diode;

a thirty-fourth capacitor having a terminal connected to the cathode of the tenth diode, and another terminal grounded;

a fourth transistor having a base connected to another terminal of the eighty-second resistor, an emitter grounded, and a collector connected to a terminal of a forty-seventh resistor;

an eighty-third resistor having a terminal connected to the direct current power source;

a fifth transistor having a collector connected to another terminal of the eighty-third resistor, and an emitter grounded;

an eighty-fourth resistor having a terminal connected to a base of the fifth transistor, and another terminal connected to a terminal of a forty-eighth resistor;

an eighty-fifth resistor having a terminal connected to the terminal of the eighty-fourth resistor, and another terminal grounded;

a sixth transistor having a base connected to the another terminal of the eighty-third resistor, and an emitter grounded;

an eighty-seventh resistor having a terminal connected to a collector of the sixth transistor, and another terminal connected to a second power supply subcircuit of the power supply subcircuits;

an eighty-eighth resistor having a terminal connected to the second power supply subcircuit;

an eighty-ninth resistor having a terminal connected to another terminal of the eighty-eighth resistor, and another terminal grounded; and a seventh transistor having a gate connected to the terminal of the eighty-ninth resistor, an emitter grounded, and a collector connected to the another terminal of the twentieth resistor.

8. A working method of a power supply circuit, comprising:

providing one or more power supply subcircuits in the power supply circuit, wherein a first power supply subcircuit of the power supply subcircuits comprises a first over-voltage protection circuit, a first under-voltage protection circuit, a first drive circuit, and a first switching circuit;

electrically connecting an input terminal of the first power supply subcircuit to an input terminal of the first over-voltage protection circuit and a first input terminal of the first under-voltage protection circuit;

electrically connecting an output terminal of the first over-voltage protection circuit to a second input terminal of the first under-voltage protection circuit;

electrically connecting an output terminal of the first under-voltage protection circuit to an input terminal of the first drive circuit; and electrically connecting an output terminal of the first drive circuit to a control terminal of the first switching circuit for on-off control of the first power supply subcircuit, wherein the first drive circuit is configured to perform one of: in response to determining that the input voltage is greater than a preset lower limit voltage and less than a preset upper limit voltage, controlling the first switching circuit to be turned on; and in response to determining that the input voltage is greater than or equal to the preset upper limit voltage and/or is less than or equal to the preset lower limit voltage, controlling the first switching circuit to be turned off; and wherein the first over-voltage protection circuit comprises:

a first resistor having a terminal connected to the input terminal of the first power supply subcircuit;

a third resistor having a terminal connected to another terminal of the first resistor, and another terminal grounded;

a fourth resistor having a terminal connected to the terminal of the third resistor;

a first operational amplifier having a non-inverting input terminal connected to another terminal of the fourth resistor;

a fifth resistor having a terminal connected to the non-inverting input terminal of the first operational amplifier, and another terminal connected to an output terminal of the first operational amplifier;

a sixth resistor having a terminal connected to an inverting input terminal of the first operational amplifier;

a second capacitor having a terminal connected to another terminal of the sixth resistor, and another terminal grounded;

a seventh resistor having a terminal connected to the terminal of the second capacitor, and another terminal grounded;

a ninth resistor having a terminal connected to the terminal of the seventh resistor, and another terminal connected to a direct current power source;

a tenth resistor having a terminal connected to the output terminal of the first operational amplifier; and a first transistor having a base connected to another terminal of the tenth resistor, and an emitter grounded.

9. The working method of claim 8, wherein the power supply subcircuits comprise N+1 power supply subcircuits, where N is a positive integer, the method further comprising:

providing N changeover circuits in the power supply circuit; and electrically connecting the N changeover circuits to the N+1 power supply subcircuits, wherein the N changeover circuits are configured to determine a priority order of the N+1 power supply subcircuits and switch one of the N+1 power supply subcircuits, which has a highest priority in the priority order and a supply voltage to which is greater than the preset lower limit voltage and less than the preset upper limit voltage, to be turned on.

10. A lighting device, comprising:

a power supply circuit comprising one or more power supply subcircuits; and a light-emitting device electrically connected to the power supply circuit, wherein a first power supply subcircuit of the power supply subcircuits comprises:

a first over-voltage protection circuit, wherein the first over-voltage protection circuit has an input terminal connected to an input terminal of the first power supply subcircuit, and is configured to receive an input voltage to the first power supply subcircuit and output a first control signal;

a first under-voltage protection circuit, wherein the first under-voltage protection circuit has a first input terminal connected to the input terminal of the first power supply subcircuit and a second input terminal connected to an output terminal of the first over-voltage protection circuit, and is configured to receive at least one of the first control signal or the input voltage and output a second control signal based on the at least one of the first control signal or the input voltage;

a first drive circuit, wherein the first drive circuit has an input terminal connected to an output terminal of the first under-voltage protection circuit to receive the second control signal; and a first switching circuit, wherein the first switching circuit has a control terminal connected to an output terminal of the first drive circuit, and is configured for on-off control of the first power supply subcircuit, wherein the first drive circuit is configured to perform one of: in response to determining that the input voltage is greater than a preset lower limit voltage and less than a preset upper limit voltage, controlling the first switching circuit to be turned on; and in response to determining that the input voltage is greater than or equal to the preset upper limit voltage and/or is less than or equal to the preset lower limit voltage, controlling the first switching circuit to be turned off; and wherein the first over-voltage protection circuit comprises:

a first resistor having a terminal connected to the input terminal of the first power supply subcircuit;

a third resistor having a terminal connected to another terminal of the first resistor, and another terminal grounded;

a fourth resistor having a terminal connected to the terminal of the third resistor;

a first operational amplifier having a non-inverting input terminal connected to another terminal of the fourth resistor;

a fifth resistor having a terminal connected to the non-inverting input terminal of the first operational amplifier, and another terminal connected to an output terminal of the first operational amplifier;

a sixth resistor having a terminal connected to an inverting input terminal of the first operational amplifier;

a second capacitor having a terminal connected to another terminal of the sixth resistor, and another terminal grounded;

a seventh resistor having a terminal connected to the terminal of the second capacitor, and another terminal grounded;

a ninth resistor having a terminal connected to the terminal of the seventh resistor, and another terminal connected to a direct current power source;

a tenth resistor having a terminal connected to the output terminal of the first operational amplifier; and a first transistor having a base connected to another terminal of the tenth resistor, and an emitter grounded.

11. The lighting device according to claim 10, wherein the power supply subcircuits comprise N+1 power supply subcircuits, where N is a positive integer, the power supply circuit further comprising:

N changeover circuits electrically connected to the N+1 power supply subcircuits, wherein the N changeover circuits are configured to determine a priority order of the N+1 power supply subcircuits and switch one of the N+1 power supply subcircuits, which has a highest priority in the priority order and a supply voltage to which is greater than the preset lower limit voltage and less than the preset upper limit voltage, to be turned on.

12. The lighting device according to claim 11, wherein the first under-voltage protection circuit comprises:

an eleventh resistor having a terminal connected to the terminal of the first resistor;

a thirteenth resistor having a terminal connected to another terminal of the eleventh resistor, and another terminal grounded;

a fourteenth resistor having a terminal connected to the terminal of the thirteenth resistor;

a second operational amplifier having a non-inverting input terminal connected to another terminal of the fourteenth resistor, a negative power supply terminal grounded, and a positive power supply terminal connected to the direct current power source;

a fifteenth resistor having a terminal connected to the non-inverting input terminal of the second operational amplifier, and another terminal connected to an output terminal of the second operational amplifier;

a sixteenth resistor having a terminal connected to an inverting input terminal of the second operational amplifier;

a fourth capacitor having a terminal connected to another terminal of the sixteenth resistor, and another terminal grounded;

a seventeenth resistor having a terminal connected to the terminal of the fourth capacitor, and another terminal grounded;

a nineteenth resistor having a terminal connected to the terminal of the seventeenth resistor, and another terminal connected to the direct current power source;

a twentieth resistor having a terminal connected to the output terminal of the second operational amplifier; and a first diode having a cathode connected to the terminal of the twentieth resistor, and an anode connected to another terminal of the twentieth resistor.

13. The lighting device according to claim 12, wherein the first drive circuit comprises:

a first optocoupler having a first pin connected to the another terminal of the twentieth resistor, and a second pin grounded;

a twenty-third resistor having a terminal connected to a fourth pin of the first optocoupler, and another terminal connected to a direct current bias power source;

a tenth capacitor having a terminal connected to the terminal of the twenty-third resistor, and another terminal grounded;

a twenty-fifth resistor having a terminal connected to the direct current power source;

a second optocoupler having a first pin connected to another terminal of the twenty-fifth resistor, and a second pin connected to the another terminal of the twentieth resistor; and a twenty-sixth resistor having a terminal connected to a third pin of the first optocoupler and a fourth pin of the second optocoupler.

14. The lighting device according to claim 13, wherein the first drive circuit further comprises:

a first field effect transistor having a gate connected to the another terminal of the twentieth resistor, and a drain connected to the direct current power source;

a second field effect transistor having a drain connected to a source of the first field effect transistor, and a gate connected to the gate of the first field effect transistor;

a ninth capacitor having a terminal connected to the drain of the second field effect transistor;

a twenty-first resistor having a terminal connected to the terminal of the ninth capacitor, and another terminal connected to another terminal of the ninth capacitor;

a second diode having a cathode connected to the another terminal of the twenty-first resistor, and an anode grounded;

a twenty-second resistor having a terminal connected to the cathode of the second diode;

a third diode having an anode connected to the terminal of the twenty-first resistor;

a twenty-fourth resistor having a terminal connected to a cathode of the third diode, and another terminal connected to the direct current power source; and an eleventh capacitor having a terminal connected to the terminal of the twenty-fourth resistor, and another terminal connected to the direct current power source.

15. The lighting device according to claim 14, wherein the first switching circuit comprises:

a third field effect transistor having a drain connected to the terminal of the eleventh resistor, and a gate connected to another terminal of the twenty-sixth resistor; and a fourth field effect transistor having a gate connected to the gate of the third field effect transistor, and a source connected to a source of the third field effect transistor.

16. The lighting device according to claim 15, wherein a first changeover circuit of the N changeover circuits comprises:

a tenth diode having an anode connected to the output terminal of the second operational amplifier;

an eighty-second resistor having a terminal connected to a cathode of the tenth diode;

a thirty-fourth capacitor having a terminal connected to the cathode of the tenth diode, and another terminal grounded;

a fourth transistor having a base connected to another terminal of the eighty-second resistor, an emitter grounded, and a collector connected to a terminal of a forty-seventh resistor;

an eighty-third resistor having a terminal connected to the direct current power source;

a fifth transistor having a collector connected to another terminal of the eighty-third resistor, and an emitter grounded;

an eighty-fourth resistor having a terminal connected to a base of the fifth transistor, and another terminal connected to a terminal of a forty-eighth resistor;

an eighty-fifth resistor having a terminal connected to the terminal of the eighty-fourth resistor, and another terminal grounded;

a sixth transistor having a base connected to the another terminal of the eighty-third resistor, and an emitter grounded;

an eighty-seventh resistor having a terminal connected to a collector of the sixth transistor, and another terminal connected to a second power supply subcircuit of the power supply subcircuits;

an eighty-eighth resistor having a terminal connected to the second power supply subcircuit;

an eighty-ninth resistor having a terminal connected to another terminal of the eighty-eighth resistor, and another terminal grounded; and a seventh transistor having a gate connected to the terminal of the eighty-ninth resistor, an emitter grounded, and a collector connected to the another terminal of the twentieth resistor.

* * * * *